(12) United States Patent
Liu

(10) Patent No.: US 10,175,693 B2
(45) Date of Patent: Jan. 8, 2019

(54) CARRIER FOR UNMANNED AERIAL VEHICLE

(71) Applicant: SZ DJI OSMO TECHNOLOGY CO., LTD., Shenzhen (CN)

(72) Inventor: Hao Liu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 97 days.

(21) Appl. No.: 15/338,147

(22) Filed: Oct. 28, 2016

(65) Prior Publication Data

US 2017/0075351 A1  Mar. 16, 2017

Related U.S. Application Data

(63) Continuation of application No. PCT/CN2015/089465, filed on Sep. 11, 2015.

(51) Int. Cl.
*G05D 1/00* (2006.01)
*H04N 5/232* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC .... G05D 1/0094; G05D 1/0011; H04N 5/232; H04N 5/23258; H04N 5/2251;
(Continued)

(56) References Cited

U.S. PATENT DOCUMENTS 8,874,283 B1 * 10/2014 Cavote ................... B64D 47/08
701/11
9,030,149 B1 *  5/2015 Chen ...................... F16M 13/04
318/638
(Continued)

FOREIGN PATENT DOCUMENTS

CN      201604796 U    10/2010
CN      203204299 U     9/2013
(Continued)

OTHER PUBLICATIONS

Translation of CN104864243. Obtained via Espacenet on Mar. 30, 2018. (Year: 2015).*
(Continued)

*Primary Examiner* — Jeffrey C Boomer
(74) *Attorney, Agent, or Firm* — Anova Law Group, PLLC

(57) ABSTRACT

The invention describes devices and methods for controlling positioning of a payload on an unmanned aerial vehicle. A carrier as described herein may provide movement of a payload relative to a central body or one or more propulsion units of the unmanned aerial vehicle. The payload may move above and below the central body or the one or more propulsion units. The carrier may comprise one or more guides, a first actuator and a second actuator. The first actuator may permit the payload to translate with respect to the one or more guides and the second actuator may permit the payload to rotate about one or more axes of rotation with respect to the one or more guides. Therefore, the positioning of the payload may be well controlled, and movability and maneuverability of the payload may be increased.

20 Claims, 21 Drawing Sheets

(51) Int. Cl.
*H04N 5/225* (2006.01)
*G03B 17/56* (2006.01)
*G03B 15/00* (2006.01)
*F16M 11/04* (2006.01)
*H04N 5/00* (2011.01)
*B64C 39/02* (2006.01)
*B64D 47/08* (2006.01)

(52) U.S. Cl.
CPC ........... *F16M 11/04* (2013.01); *G03B 15/006* (2013.01); *G03B 17/561* (2013.01); *G05D 1/0011* (2013.01); *H04N 5/00* (2013.01); *H04N 5/2251* (2013.01); *H04N 5/2257* (2013.01); *H04N 5/232* (2013.01); *H04N 5/2328* (2013.01); *H04N 5/23258* (2013.01); *B64C 2201/027* (2013.01); *B64C 2201/127* (2013.01); *B64C 2201/146* (2013.01); *G03B 2205/0007* (2013.01)

(58) Field of Classification Search
CPC ...... H04N 5/2328; H04N 5/2257; H04N 5/00; G03B 17/561; G03B 15/006; G03B 2205/0007; F16M 11/04; B64C 39/024; B64C 2201/146; B64C 2201/027; B64C 2201/127; B64D 47/08
See application file for complete search history.

(56) References Cited

U.S. PATENT DOCUMENTS

| | | | |
|---|---|---|---|
| 9,533,760 B1* | 1/2017 | Wagreich | H04N 7/185 |
| 9,884,681 B2* | 2/2018 | Wang | B64C 39/028 |
| 10,046,844 B2* | 8/2018 | Wang | B64C 1/063 |
| 2003/0212478 A1 | 11/2003 | Rios | |
| 2013/0048792 A1 | 2/2013 | Szarek et al. | |
| 2014/0034775 A1* | 2/2014 | Hutson | B64C 39/024 244/17.17 |
| 2014/0055613 A1* | 2/2014 | Ohtomo | H04N 7/18 348/144 |
| 2014/0263823 A1* | 9/2014 | Wang | B64C 39/028 244/17.23 |
| 2014/0267805 A1* | 9/2014 | Webb | H04N 5/2328 348/208.2 |
| 2014/0371952 A1* | 12/2014 | Ohtomo | B64C 39/024 701/2 |
| 2015/0220085 A1* | 8/2015 | Ohtomo | G08G 5/0069 701/2 |
| 2017/0029097 A1* | 2/2017 | Matsumoto | B64C 27/006 |
| 2017/0197714 A1* | 7/2017 | Golden | B64C 39/024 |
| 2017/0248948 A1* | 8/2017 | Otani | G06T 7/70 |
| 2018/0023974 A1* | 1/2018 | Otani | G01C 23/00 |

FOREIGN PATENT DOCUMENTS

| | | | | |
|---|---|---|---|---|
| CN | 103979106 A | | 8/2014 | |
| CN | 203902844 U | | 10/2014 | |
| CN | 104386249 A | | 3/2015 | |
| CN | 104590562 A | | 5/2015 | |
| CN | 104864243 A | | 8/2015 | |
| DE | 102013108207 A1 | | 2/2015 | |
| JP | H05161037 A | | 6/1993 | |
| JP | H110256350 A | | 9/1998 | |
| JP | 2005271831 A | | 10/2005 | |
| JP | 2010179914 A | | 8/2010 | |
| JP | 2013079034 A | | 5/2013 | |
| JP | 2014167413 A | | 9/2014 | |
| JP | 2015145784 A | | 8/2015 | |
| JP | 2015523930 A | | 8/2015 | |
| JP | 2016219941 A | * | 12/2016 | |
| KR | 101783545 B1 | * | 10/2017 | |
| WO | WO-2017222249 A1 | * | 12/2017 | B64C 39/02 |

OTHER PUBLICATIONS

Translation of JP2016219941. Obtained via Espacenet on Mar. 30, 2018. (Year: 2016).*
Translation of KR101783545. Obtained via Espacenet on Mar. 30, 2018. (Year: 2017).*
The World Intellectual Property Organization (WIPO) International Search Report and Written Opinion for PCT/CN2015/089465 Jun. 6, 2016 9 Pages.

* cited by examiner

CARRIER FOR UNMANNED AERIAL VEHICLE

CROSS-REFERENCE

This application is a continuation application of International Application No. PCT/CN2015/089465, filed on Sep. 11, 2015, the content of which is hereby incorporated by reference in its entirety.

BACKGROUND OF THE INVENTION

Unmanned vehicles, such as ground vehicles, aerial vehicles, surface vehicles, underwater vehicles, and spacecraft, have been developed for a wide range of applications including surveillance, search and rescue operations, exploration, and other fields. In some instances, unmanned vehicles may be equipped with a payload configured to collect data during operation. For example, unmanned aerial vehicles (UAV) may be equipped with imaging devices, such as cameras, for aerial photography. A payload may be coupled to an unmanned vehicle via a carrier that provides movement of the payload in one or more degrees of freedom.

However, existing unmanned vehicles equipped with an imaging device can be less than ideal in photography. In most instances, due to restrictions imposed by a coupling of the imaging device to the unmanned vehicles, the existing unmanned vehicles may only be capable of performing limited shot angles before running into obstructions. Therefore, it would be hard for the existing unmanned vehicle to achieve multidimensional photography, for example, for a panoramic image.

SUMMARY OF THE INVENTION

A need exists for improved mechanisms and methods to support positioning of a payload on a vehicle, such as an unmanned aerial vehicle (UAV). Systems, methods, and carriers to support positioning of a payload are described herein. These may permit the payload to move in different directions, thereby achieving a better movability and manipulability of the payload. The carrier herein may be supported by or affixed to a central body of a vehicle and support the payload. In operation, the carrier may be configured to permit the payload to move with respect to a component or a part of the vehicle, such as the central body or propulsion units of the vehicle. Any description herein of a UAV may apply to any other type of vehicle, and vice versa.

The carrier herein may comprise one or more actuators or actuation assemblies that may drive the payload to move relative to the central body or propulsion units of the UAV. To further improve the flexibility and operability of the payload, a gimbal or gimbal mechanism may be part of the carrier and may connect to the payload. A gimbal mechanism as described herein may provide rotation of the payload about one or more different axes, wherein the rotation about the different axes is controlled by respective different actuators that may be actuated independently of one another. The actuators may optionally be fixed in position and orientation relative to one another, such that none of the actuators is driven by the other. Therefore, the gimbal mechanism can control movement of the payload about various degrees of freedom in a parallel manner. The gimbal mechanisms may have a compact configuration that allows for minimizing or reducing the volume and weight of the gimbal mechanisms, while improving the stability of movement provided by the gimbal mechanisms.

In one aspect of the invention, an unmanned aerial vehicle (UAV) is described. The unmanned aerial vehicle comprises a central body. The unmanned aerial vehicle further comprises one or more propulsion units configured to propel the UAV through the air. The unmanned aerial vehicle additionally comprises a carrier supported by the central body, wherein the carrier is configured to support a payload and permit the payload to translate relative to the central body.

In another aspect of the invention, a remote controller for controlling positioning of a payload on an unmanned aerial vehicle (UAV) is described. The remote controller comprises a processor configured to generate a user control instruction for controlling the UAV as discussed above. The remote controller further comprises a communication unit configured to transmit the user control instruction to the UAV, wherein the user control instruction comprises instructions for the carrier to translate the payload relative to the central body.

In another aspect of the invention, a method for controlling positioning of a payload on an unmanned aerial vehicle (UAV) is described. The method comprises supporting a carrier on a central body of the UAV. The method also comprises operating one or more propulsion units to propel the UAV through the air. The method further comprises supporting the payload using the carrier. The method additionally comprises actuating the carrier to permit the payload to translate relative to the central body.

In another aspect of the invention, an unmanned aerial vehicle (UAV) is described. The UAV comprises a central body. The UAV also comprises one or more propulsion units configured to propel the UAV through the air. The UAV further comprises a carrier supported by the central body, wherein the carrier is configured to support a payload and permit the payload to pass through the central body.

In another aspect of the invention, a remote controller for controlling positioning of a payload on an unmanned aerial vehicle (UAV) is described. The remote controller comprises a processor configured to generate a user control instruction for controlling the UAV as discussed above. The remote controller also comprises a communication unit configured to transmit the user control instruction to the UAV, wherein the user control instruction comprises instructions for the carrier to permit the payload to pass through the central body.

In another aspect of the invention, a method for controlling positioning of a payload on an unmanned aerial vehicle (UAV) is described. The method comprises supporting a carrier on a central body of the UAV. The method also comprises operating one or more propulsion units to propel the UAV through the air. The method further comprises supporting the payload using the carrier. The method additionally comprises actuating the carrier to permit the payload to pass through the central body.

In another aspect of the invention, a carrier configured to support a payload on an unmanned aerial vehicle (UAV) is described. The carrier comprises one or more guides. The carrier also comprises a first actuator configured to permit the payload to translate with respect to the one or more guides. The carrier further comprises a second actuator configured to permit the payload to rotate about one or more axes of rotation with respect to the one or more guides.

In another aspect of the invention, a remote controller for controlling positioning of a payload on an unmanned aerial vehicle (UAV) is described. The remote controller comprises a processor configured to generate a user control instruction for controlling the carrier as described above. The remote controller also comprises a communication unit configured to transmit the user control instruction to the UAV, wherein the user control instruction comprises instructions for the carrier to permit the payload to translate with respect to the one or more guides and instructions for the carrier to permit the payload to rotate about one or more axes of rotation with respect to the one or more guides.

In another aspect of the invention, a method of supporting a payload on an unmanned aerial vehicle (UAV) is described. The method comprises providing one or more guides. The method also comprises configuring a first actuator to permit the payload to translate with respect to the one or more guides. The method further comprises configuring a second actuator to permit the payload to rotate about one or more axes of rotation with respect to the one or more guides.

It shall be understood that different aspects of the invention may be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference in its entirety.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DETAILED DESCRIPTION OF THE INVENTION

Figure 1:
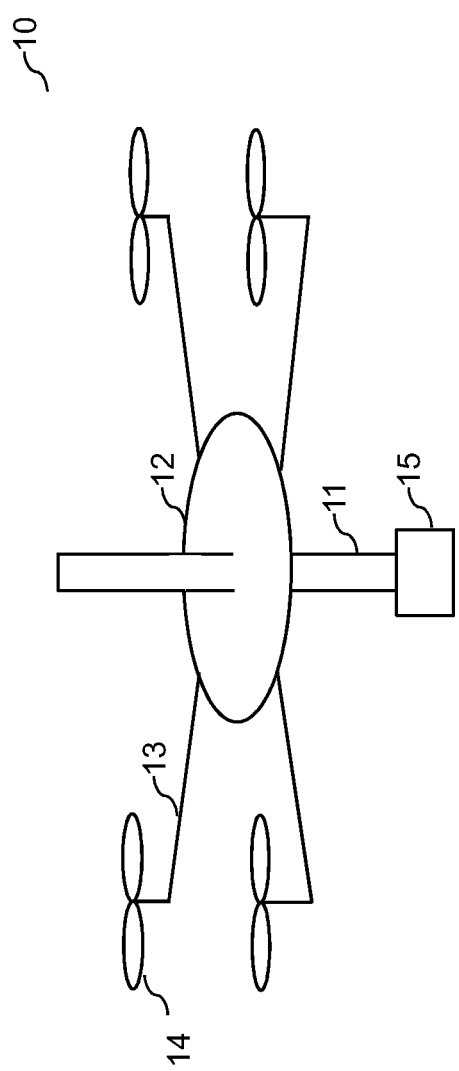
FIG. 1 illustrates a schematic of an unmanned aerial vehicle (UAV) with a carrier in accordance with embodiments of the invention.

Devices, mechanisms and methods as described herein provide controlling the positioning of a payload relative to one or more components or parts of a vehicle, such as relative to a central body or propulsion units of an unmanned aerial vehicle (UAV). The payload may be coupled to the vehicle through a carrier and the carrier may permit or drive the payload to translate relative to one or more components of the vehicle. The carrier may be configured to support the payload and drive the payload to move using one or more actuators or actuation assemblies. The carrier may comprise one or more guides and one, two, or more actuators. One or more actuators may be configured to permit the payload to translate with respect to the one or more guides. Another one or more actuators may be configured to permit the payload to rotate about one or more axes of rotation with respect to the one or more guides. In some embodiments, the one or more guides may be one or more bars or rods arranged on or fixed within the central body and the payload may move along the bars or rods to translate relative to a central body of the vehicle or pass through the central body of the vehicle.

The carrier herein may optionally comprise a gimbal mechanism that is coupled to the payload. The gimbal mechanism may provide a rotation of a payload about a single axis or multiple axes (e.g., two or more, three or more, four or more, five or more, etc.). For each axis, the gimbal mechanism may include a corresponding gimbal component that may include an actuator and/or frame component. Therefore, the gimbal mechanism can control movement of the payload about multiple degrees of freedom in a parallel manner. Further, the gimbal mechanism as described herein may provide rotation of a payload about at least one axis, two axes, or three different axes, wherein the rotation about the axes can be controlled by corresponding actuators that may be actuated independently of one another. The actuators may be fixed in position and orientation relative to one another, such that neither actuator is driven by the other. The gimbal mechanisms described herein may have a compact configuration that allows for minimizing or reduction of the volume and/or weight of the gimbal mechanisms, while improving the stability of rotation of the payload.

The vehicle described herein may be an aerial vehicle, such as an unmanned aerial vehicle (UAV), and may be equipped with a payload, such as an imaging device, e.g., a camera, for aerial photography. Any description herein of a UAV may apply to any type of vehicle, such as any type of aerial vehicle or vehicle capable of flight. Any description of any type of vehicle may apply to any vehicle or any other type of vehicle. A payload can be supported by a carrier, which may optionally comprise a gimbal mechanism as mentioned above, that provides for movement of the payload. When the payload is coupled to a UAV, which may be limited in volume and weight, the payload may also be small and lightweight. A carrier to be coupled to a UAV for supporting a payload may also have a low volume and weight, while providing stable motion of the payload. This may allow the payload, such as an imaging device to capture views from many different positions and/or orientations. The positions of the payload may be determined with the aid of one or more sensors, such as inertial sensors or Hall effect sensors, which may be arranged on the payload, the carrier, and/or the UAV.

Movement of the payload relative to the UAV may be carried out in many different manners based on the configurations of the carrier. In some embodiments, the carrier may be configured to permit the payload to translate relative to the central body of the UAV. The payload may translate in a vertical direction relative to the central body, and/or may translate in a horizontal direction relative to a component of the UAV, such as a central body. The carrier may also be configured to permit the payload to move above and below the central body or propulsion units of the UAV. The carrier may further be configured to permit the payload to pass through the central body of the UAV. The movement as described herein may be at least one of a vertical movement and a horizontal movement of the payload relative to the central body or propulsion units of the UAV. In some embodiments, the carrier may be configured to permit the payload to translate in the vertical direction without requiring any translation in the horizontal direction. In some other embodiments, the carrier may be configured to permit the payload to translate in the vertical direction while permitting the translation in the horizontal direction. The movement of the payload may commence in response to actuation of at least one actuator of the carrier. Such translation of the payload relative to the UAV may provide additional flexibility and versatility in use of the payload. For instance, different points of view may be afforded to the payload as the position of the payload switches relative to the UAV. The payload may be used to collect information below and above the UAV by changing locations.

The operations of a translational portion of the carrier and a rotational portion of the carrier (e.g., gimbal) may be performed independently of each other or in combination. For example, the translational portion of the carrier may permit the payload to translate in the vertical direction while permitting the rotation of the payload driven by the gimbal. Further, the carrier may permit the payload to translate (e.g., in the vertical direction or horizontal direction) without requiring the rotation of the payload. In this manner, some embodiments of the invention may be implemented without any involvement of the gimbal.

Figure 2:
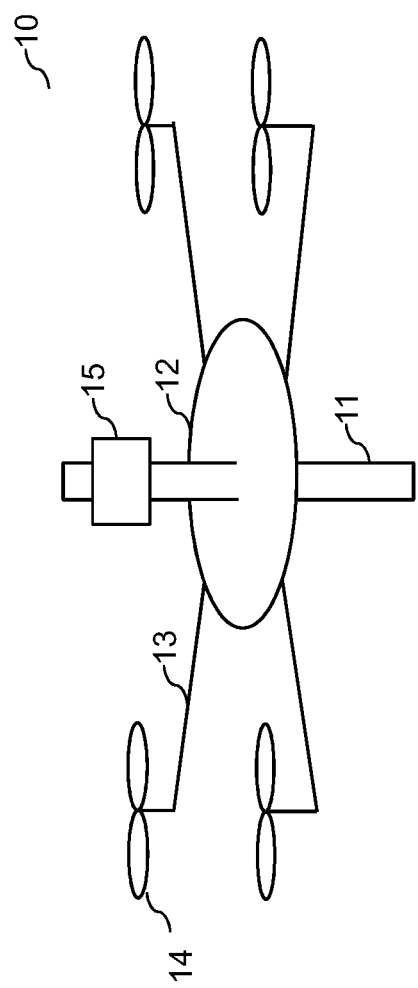
FIG. 2 illustrates a schematic of the UAV of FIG. 1 with the carrier capable of moving a payload upwards in accordance with embodiments of the invention.

Referring now to the drawings, FIGS. 1 and 2 each schematically illustrate an example of an unmanned aerial vehicle (UAV) 10 with a carrier 11. A payload 15 may be supported by the carrier, which may permit movement of the payload relative to the UAV.

The UAV 10 may comprise a central body 12 and frame assemblies 13 disposed respectively on the central body 12. A plurality of propulsion units 14 may be mounted respectively on the frame assemblies 13. FIG. 1 illustrates a moment in time when a payload 15 is below the central body of the UAV. FIG. 2 illustrates a moment in time when the payload 15 is above the central body of the UAV.

The UAV may be used to support a load. The load may include the carrier and/or the payload. The central body of the UAV may optionally support the load. The UAV may be capable of flight while supporting the load.

In some embodiments the frame assemblies may be one or more arms or branches that may extend from the central body. The frame assemblies may radially extend from the central body. Each frame assembly may support a single propulsion unit or may support multiple propulsion units. A propulsion unit may include one or more rotor blades and an actuator that may drive movement of the one or more rotor blades. Any number of frame assemblies may be provided on the UAV. For example, one, two, three, four, five, six, seven, eight, nine, ten, or more frame assemblies may extend from a central body. The frame assemblies may substantially extend laterally relative to the central body. The propulsion units may be positioned to be coplanar with the central body. Alternatively, the propulsion units may be above the central body and/or below the central body. The location of the propulsion units relative to the central body may remain fixed or may be variable. In some instances, a vertical angle of the frame assemblies relative to one another and/or the central body of the UAV may remain the same, or may be variable.

The central body may support one or more electrical components of the UAV. Examples of the electrical components may include, but are not limited to, a flight controller, one or more processors, a memory storage unit, an inertial measurement unit (IMU), a global positioning system (GPS) unit, one or more sensors, a communication unit, and/or a power unit (e.g., battery). In some embodiments, one or more electrical components may be partially or completely enclosed within a housing of the central body. The one or more electrical components may be stored in one or more cavities within the central body.

The payload may be configured to perform a variety of functions. Further, the payload may be configured not to perform any operation or function. Examples of payloads may include a device that collects data (e.g., imaging device (for visible light, infrared, ultra-violet (UV), geo-thermal or any other type of emission); a device that detects one or more particles; a device that detects a field such as a magnetic field, electric field, radio field; radiation detector; microphone, any type of sensor as described in greater detail elsewhere herein), a device that provides an emission (e.g., light emitter, image emitter, heat emitter, radio emitter, wireless signal emitter particle emitter), a device that interacts with the environment (e.g., robotic arm, sample collector, liquid distributer, pesticide or fertilizer sprayer), or any other type of device or combinations thereof. A payload can also include one or more sensors for surveying one or more targets, for example, an environment around the sensor. Any suitable sensor can be incorporated into the payload, such as an image capture device (e.g., a camera), an audio capture device (e.g., a parabolic microphone), an infrared imaging device, or an ultraviolet (UV) imaging device. The sensor can provide static sensing data (e.g., a photograph) or dynamic sensing data (e.g., a video). In some embodiments, the sensor provides sensing data for the target of the payload device. Alternatively or in combination, the payload can include one or more emitters for providing signals to one or more targets. Any suitable emitter can be used, such as an illumination source or a sound source. In some embodiments, the payload can include one or more transceivers, such as for communication with a module remote from the movable object. Optionally, the payload can be configured to interact with the environment or a target. For example, the payload can include a tool, instrument, or mechanism capable of manipulating objects, such as a robotic arm. The payload may be detachably coupled or mounted to the carrier via a gimbal or gimbal mechanism. Further, a payload as used herein may refer to any part of a load or an object supported by a gimbal.

In some embodiments, the payload may include an imaging device configured to acquire and/or transmit one or more images of objects within the imaging device's field of view. Examples of an imaging device may include a camera, a video camera, an infrared imaging device, an ultraviolet imaging device, a thermal imaging device, smartphone/cell phone with a camera, or any device having the ability to capture optical signals. A non-imaging device may include any other devices such as for collecting or distributing sound, particles, liquid, or the like. Examples of non-imaging devices may include a microphone, a loud speaker, a particle or radiation detector, a fire hose, and the like. Any description herein of a camera payload can be applied to other types of payload devices.

The carrier may be coupled to any suitable portion of the UAV. For instance, the carrier may be coupled to the central body. For example, the carrier may be coupled to an inner edge or outer edge of the central body when the central body is designed and manufactured as having a hollow structure. The carrier may be configured to extend above and below the central body of the UAV. The length of the carrier extending above the central body may equal the length of the carrier extending below the central body. Alternatively, the length of the carrier extending above the central body may be longer than the length of the carrier extending below the central body, or vice versa. The carrier may pass through the central body of the UAV. In some instances, the lateral dimensions of the carrier do not extend beyond the lateral dimensions of the central body. Alternatively, the lateral dimensions of the carrier may extend beyond the lateral dimensions of the central body.

The carrier may optionally have an elongated structure. The length of the carrier may be orthogonal to a plane comprising the propulsion units of the UAV. For instance, the carrier may be substantially vertically oriented relative to a central body of the UAV. Alternatively, the length of the carrier may be parallel to a plane comprising the propulsion units of the UAV. For instance, the carrier may be substantially horizontally oriented relative to a central body of the UAV. In some instances, the length of the carrier may be at any angle relative to a plane comprising the propulsion units of the UAV. For instance the carrier may be a substantially oblique angle relative to the central body of the UAV.

A coupling between the UAV and the carrier may be a rigid coupling. In some instances, the positioning and/or orientation of the carrier relative to the UAV (e.g., any component of the UAV) may be fixed. Alternatively, the positioning and/or orientation of the carrier relative to the UAV (e.g., any component of the UAV) may be variable. Such positioning and/or orientation may be varied manually by a user or with aid of one or more actuators. In some instances, the coupling between the UAV and the carrier may offer some vibration damping. The vibration damping may reduce vibrations in the vertical direction, the horizontal direction, or any combination thereof. In some instances, a vibration dampening mechanism may cause the carrier to maintain its orientation relative to the UAV. In some instances, the vibration dampening mechanism may permit some variation in the orientation of the carrier relative to the UAV. The carrier may permit the payload supported by the carrier to move or translate with respect to the UAV. Any description of positioning, orientation, and/or movement in relation to the UAV may apply to positioning, orientation, and/or movement in relation to any component of the UAV. Examples of components of the UAV may include, but are not limited to, a central body, frame assemblies (e.g., arms or branches), propulsion units, landing stands, electronic components, sensors, controllers, memory units, power units (e.g., batteries), or any other component of the UAV.

In some embodiments of the invention, the payload may be driven by the carrier to translate along a length of the carrier when the carrier comprises one or more guides for guiding the payload to move. The payload may translate relative to the UAV. The payload may translate relative to a static reference frame (e.g., environment). For instance, the payload may translate relative to a direction of gravity. For instance, as illustrated in FIGS. 1 and 2, the carrier may permit the payload to translate in a vertical direction (e.g., from a bottom end of a carrier to a top end of a carrier, or from a top end of a carrier to a bottom end of the carrier). In this manner, the carrier may permit the payload to translate below or above the central body or the propulsion units of the UAV. Further, the carrier may enable the payload to pass through the central body. Therefore, when the payload is embodied as an imaging device, the aerial photography with flexible shooting angles and unobstructed visual fields could be realized by moving the imaging device below or above the central body or the blades of the UAV, or by moving the imaging device to pass through the central body of the UAV. This may provide a wider range of capturing images without obstruction. For instance, if a user wishes to capture images below the UAV, the imaging device may be positioned below the UAV central body to provide a wide range of viewing options without being obstructed by the central body and/or propulsion units of the UAV. If a user wishes to capture images above the UAV, the imaging device may be captured above the UAV central body to provide a wide range of viewing options above the body without being obstructed by the central body and/or propulsion units of the UAV.

The carrier may permit the payload to translate in relation to the UAV. The payload may translate along a length of the carrier. The payload may traverse the entire length of the carrier. In some instances, the payload may reach a static viewing position at the extreme ends of the carrier (e.g., at the bottom of the carrier and/or the top of the carrier). In some instances, the payload may reach a static viewing position anywhere along the length of the carrier. For instance, the payload may stop somewhere between the extreme ends of the carrier. In some instances, the payload may stop at one or more fixed positions between the extreme ends of the carrier. Alternatively, the payload may be able to stop at any point between the extreme ends of the carrier.

The payload may be capable of rotating about one or more axes relative to the UAV. The payload may rotate when the payload is stopped along the carrier. In some instances, the payload may rotate only when the payload is no longer in translational motion. Alternatively, the payload may rotate and engage in translational motion simultaneously. The payload may rotate while moving along the carrier.

The carrier as described herein may be configured to have various structures or arrangements. In some instances, the carrier may have at least one rod or bar to support the payload and drive the payload to move along the rod or bar. In some other instances, the carrier may have two rods or bars that are arranged to be substantively parallel to each other and thereby the carrier may permit the payload to move along the two rods or bars by actuating one or more actuators, e.g., motors. In some instances, a single rod or bar may drive the motion of the payload while one or more other rods or bars provide stability or support for the payload. Alternatively, multiple rods or bars may drive the motion of the payload.

In order to permit the movement of the payload relative to the UAV, the carrier may include one or more actuators or actuation assemblies. The actuator may comprise one or more moving parts. The actuator may allow movement of the payload relative to any component of the UAV, such as the central body or propulsion units of the UAV. The actuator may be a rotary actuator configured to produce a rotary motion or torque. The actuator may comprise an automatic or machine-driven component such as an electric motor. In some instances, the motor may comprise a brushless motor. In some embodiments, the motor may be a direct drive motor which is capable of obtaining a rotational force without any reductions from a belt, a chain or a gearbox. Further, the direct drive motor may provide highly-accurate positioning at a high velocity without being adversely influenced by, e.g., unevenness in torque or by lost motion. In some instances, the motor may comprise a servomotor. A servomotor may comprise a motor, a sensor, and a controller for precise control of the motor. A servomotor may comprise sensors (e.g., a Hall sensor or a potentiometer) to detect a position, speed, and/or acceleration of the motor and the payload coupled to the motor. A controller may receive data (e.g., information) from the sensors and further control an angular position, velocity, acceleration and/or torque of the motor as desired. Alternatively or in combination, an actuator may comprise a manually-manipulated component such as a lever, a handle, a knob, or a tilting mechanism. The payload may start to move in response to an actuation of the corresponding actuator (e.g., motor).

An actuation of the system, comprising one or more actuators, may cause the payload to translate relative to the UAV. For instance, one or more actuators may cause the payload to traverse the length of a carrier. If the carrier comprises one or more rods/bars, the actuator may drive the payload to travel along the length of the one or more rods/bars. The actuators may cause movement of one or more components of the one or more rods/bars to effect movement of the payload along the rods/bars.

An actuation assembly, comprising one or more actuators, may cause the payload to rotate in relative to the UAV. For instance, the one or more actuators may be part of a gimbal mechanism that may permit rotation of the payload about one, two, three, or more axes relative to the UAV. The one, two, three or more axes may be orthogonal to one another in an original state. Alternatively, they need not be orthogonal to one another. The axes may include a pitch axis, a yaw axis, and/or a roll axis of the payload.

In some embodiments, the actuator may receive an electronic signal providing instructions affecting actuation of the actuator. In some instances, the instructions may be provided from a remote controller (e.g., a user control instruction or command). The user control instruction to actuate may be received in response to human input. A user may be able to specify positioning/orientation of the payload, and/or movement of the payload. The user may directly manually control the movement of the payload so that an input from the user directly translates to a response by the payload. For instance, while a user provides an "up" command, the payload may move upwards, and may cease to move upwards when the user stops providing the "up" command. Alternatively, the control may be automated or semi-automated. For instance, the user may specify a desired position of the payload, and the system may automatically move the payload to the desired position. For instance, if the user specifies the user wishes the camera to be in the uppermost position, and angled 45 degrees upwards, the system may automatically move the payload to that position. In some instances, a user may be able to switch between a manual control and an automated or semi-automated control mode. Alternatively or in conjunction, the command to actuate may be generated automatically by a controller without any human interference. The automated generation may occur at a remote controller or a controller on-board the UAV. The automated generation may occur in response to one or more sensed condition (e.g., sensed condition about the environment, UAV, carrier, and/or payload).

The actuator may actuate in response to the electronic signal. Actuation of the actuator may directly drive the frame and/or components coupled to the actuator. For example a gimbal to which the payload may be coupled may be actuated, and/or a translational portion of the carrier may be actuated. Actuation of the actuator may directly cause components directly coupled to the actuator to rotate about one or more axes, or translate in parallel to a longitudinal axis of the actuator. The actuation herein may cause or drive the payload to move relative to the central body or the propulsion units of the UAV (e.g., translationally and/or rotationally).

The payload may translate relative to the UAV at a constant velocity. In some instances, the movement of the payload may not exceed a maximum velocity ceiling. In some instances, the payload may translate relative to the UAV at a variable velocity. In some instances, the velocity and/or acceleration of the payload relative to the UAV may depend on an input from a user. A user may manually control the velocity and/or acceleration of the payload translation. Alternatively, the velocity and/or acceleration of the payload translation may be controlled in an automated or semi-automated manner. Similarly, the payload may rotate relative to the UAV at a constant velocity. In some instances, the rotation of the payload may not exceed a maximum velocity ceiling. In some instances, the payload may rotate relative to the UAV at a variable velocity. In some instances, the angular velocity and/or angular acceleration of the payload relative to the UAV may depend on an input from a user. A user may manually control the angular velocity and/or angular acceleration of the payload. Alternatively, the angular velocity and/or angular acceleration of the payload may be controlled in an automated or semi-automated manner.

In some embodiments, the payload may be capable of translating at a rate of at least about 1 mm/s, 2 mm/s, 3 mm/s, 5 mm/s, 1 cm/s, 2 cm/s, 3 cm/s, 4 cm/s, 5 cm/s, 7 cm/s, 10 cm/s, 15 cm/s, 20 cm/s, 25 cm/s, 30 cm/s, 40 cm/s, 50 cm/s, 75 cm/s, or 1 m/s. In some instances, the payload may have a maximum translation rate of any of the values provided herein or less.

A direction of rotation of a component (e.g., of a frame) may be clockwise or counter-clockwise. An actuation may affect rotation of the components in a clockwise direction or a counter-clockwise direction. An actuator may permit control of rotation about both a clockwise and counter-clockwise direction. The rotation of the components in the clockwise direction or the counter-clockwise direction may cause the payload to move along the one or more guides of the carrier until the carrier reaches the opposite ends of the guides, as exemplarily illustrated in FIG. 2. In some instances, the rotational direction of an actuator may change to change the direction of motion of a payload (e.g., change translational direction, or change rotational direction).

In some instances, the carrier may provide one or more distance measuring components to measure the distance by the payload along the carrier. In some instances, the position of the payload with respect to a component of the UAV and/or an end of the carrier may be determined. In this way, the movement of the payload with respect to the UAV may be precisely controlled and therefore corresponding tasks as performed by the payload could be completed at desired or requested locations. The distance moved may be an absolute distance that the payload moves or a relative distance based on a selection of the different reference points (e.g., ends of the carrier, one or more components of the UAV). The position of the payload along the carrier may be determined to a high degree of specificity. In some instances, the position of the payload may be determined to within several cm, 1 cm, 5 mm, 3 mm, 2 mm, 1 mm, 0.5 mm, or 0.1 mm or less. A distance to be moved by the payload may be predetermined or preset according to different requirements or for different purposes, for example, for aerial photography, surveillance, etc. In additional to linear position, a rotational position of the payload may also be similarly determined. The angle of rotation about one or more axes for a payload may be precisely controlled. In some instances, the angular position of the payload may be determined to within 10 degrees, 5 degrees, 3 degrees, 2 degrees, 1 degree, 0.5 degrees, or 0.1 degrees or less.

In some embodiments, the movement of the UAV, carrier, and/or payload relative to a fixed reference frame (e.g., the surrounding environment) and/or to each other may be controlled by a terminal. The terminal may be a remote control device or a remote controller at a location distant from the UAV, carrier, and/or payload. Any suitable user input can be used to interact with the terminal, such as manually entered commands, voice control, gesture control, or position control (e.g., via a movement, location or tilt of the terminal) for controlling the positioning of the payload on the aerial vehicle. The remote terminal may include one or more buttons, joysticks, keys, trackballs, touchpads, touchscreens, microphones, inertial sensors, heat sensors, cameras, or any other user interactive device that may permit interaction with one or more users.

The terminal may be further used to control any suitable state of the UAV, carrier, and/or payload. For example, the terminal may be used to control the position and/or orientation of the UAV, carrier, and/or payload relative to a fixed reference from and/or to each other. In some embodiments, the terminal may be used to control individual elements of the UAV, carrier, and/or payload, such as the actuation assembly of the carrier, a sensor of the payload, or an emitter of the payload. The terminal may include a communication unit, e.g., a wireless communication unit device, adapted to communicate with one or more of the UAV, carrier, or payload. The terminal may include a suitable display unit for visually or graphically presenting information of the UAV, carrier, and/or payload.

Figure 3:
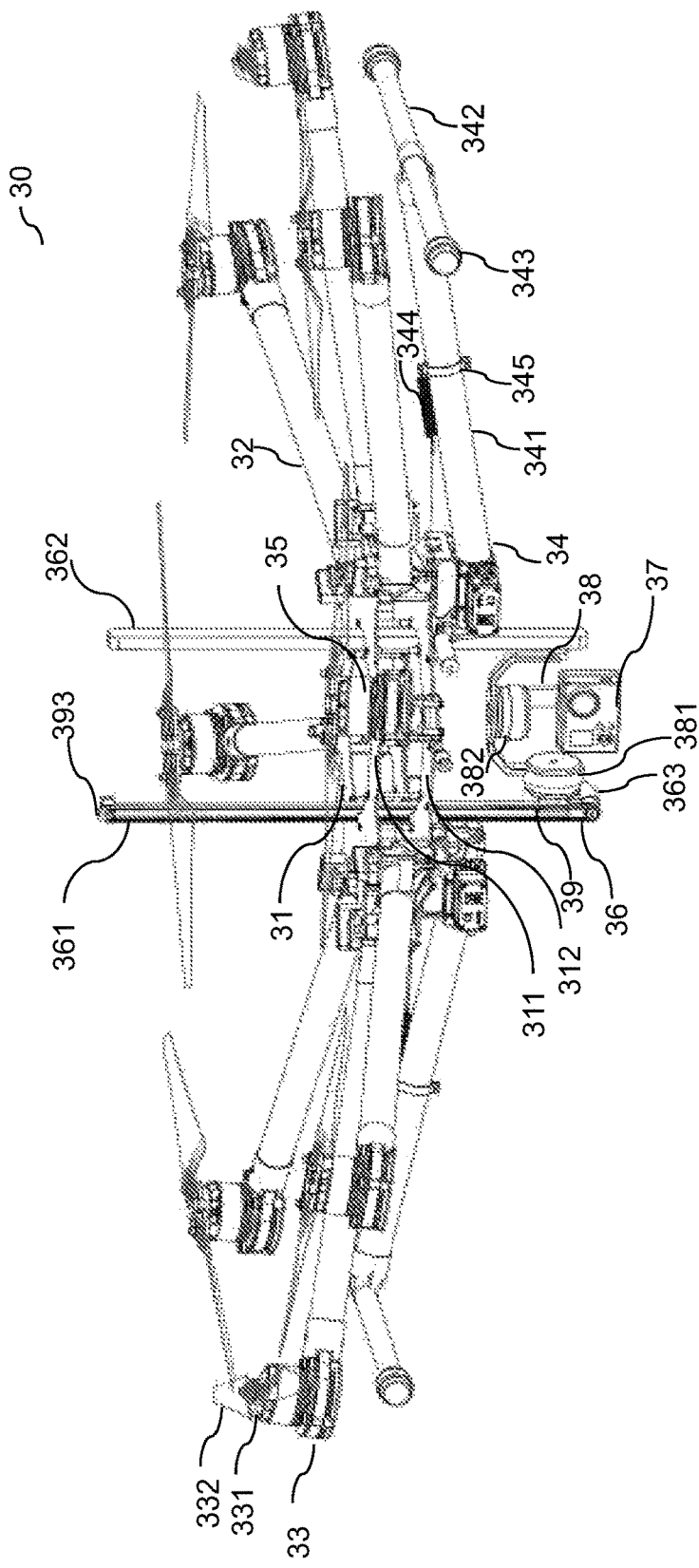
FIG. 3 is an example of a UAV with a carrier in accordance with embodiments of the invention.

FIG. 3 is an example of a UAV 30 with a carrier in accordance with embodiments of the invention.

A UAV 30 may comprise a central body 31 and one or more frame assemblies 32 (e.g., arms or branches) disposed respectively on the central body. A plurality of propulsion units 33 are mounted respectively on the frame assemblies extending from the central body. Further, the UAV may comprise one or more support members 34 which are provided for supporting the UAV when resting on a surface (e.g., the ground).

The central body 31 may be designed as a flat structure having a polygonal shape. The polygon may be a regular shape, such as a circle, a triangle, a quadrilateral (e.g., square, rectangle, trapezoid, or rhombus), a hexagon, an octagon and so on. The central body may optionally have a central hole or cavity 35. The cavity nested within the polygon may have the same shape as the polygon or different shape from the external polygon. For example, the cavity may be designed as having a shape of circle, a triangle, a quadrilateral (e.g., square, rectangle, trapezoid, or rhombus), a hexagon, or an octagon at the center of the central body. In some embodiments, the central body may be designed as having a multilayer structure, such as two layers 311 and 312 that are parallel to each other with a gap as shown in FIG. 3. The multiple layers may be formed by multiple plates that may have the same shape or dimension, or that may have different shapes or dimensions. The frame assemblies that are coupled with the propulsion units may be respectively coupled to the central body at the vertices of the polygon between the layers. For example, if eight frame assemblies are provided, they may be located at the vertices of an octagonal central body. In this manner, the structural arrangements of the UAV may become more simplified and compact, and a better balance, firmness and stabilization of the UAV may be achieved.

Each propulsion unit may be used to enable the UAV to take off, land, hover, and move in the air with respective to up to three degrees of freedom of translation and/or up to three degrees of freedom of rotation. The propulsion units may include one or more rotors 331. The rotors may include one or more rotor blades 332 coupled to a shaft of the rotor 331. The rotor blades and shaft may be driven to rotate by a suitable drive mechanism, such as a motor. Although the propulsion units of the UAV are depicted as eight rotors, any suitable number, type, and/or arrangement of propulsion units may be used. For example, the number of rotors may be one, two, three, four, five, six, seven, eight, or more. The rotors may be oriented vertically, horizontally, or at any other suitable angle with respect to the central body or the UAV. The angle of the rotors may be fixed or variable. The distance between shafts of opposite rotors can be any suitable distance, such as less than or equal to 2 m, less than equal to 5 m. Optionally, the distance may be within a range from 40 cm to 1 m, from 10 cm to 2 m, or from 5 cm to 5 m. The propulsion units as described herein may be driven by any suitable motor, such as a DC motor (e.g., brushed or brushless) or an AC motor. In some instances, the motor may be adapted to mount and drive a rotor blade.

In some embodiments, each of the frame assemblies may be detachable from the central body. Likewise, the rotors of each propulsion unit may also be advantageously detachable for stowage, and preferably detachably mountable upon the shaft. Alternatively, the frame assemblies and/or propulsion units may remain attached. The frame assemblies may or may not be movable relative to the central body. In some instances, the frame assemblies may be movable with aid of one or more actuators.

As illustrated in FIG. 3, the UAV may further comprise one or more support members 34 which are provided for supporting the UAV when resting on a surface (e.g., the ground). The support member may comprise a shaft 341, which may be rotatably connected to the central body of the UAV and a cross bar 342. The support member may be capable of rotating with respect to the central body of the UAV. The cross bar may be located at a distal end or near the distal end of the shaft. The cross bar may be arranged at a suitable angle relative to the shaft, for example, extending perpendicular or approximately perpendicular to the shaft. The cross bar may be coupled to the shaft via any suitable portion of the cross bar, such as at or near the midpoint of the cross bar. In some embodiments, one or more supporting component 343 may be arranged on or near each end of the cross bar. The one or more supporting components may be embodied as one or more circumferential bands or hoops, which may be sheathed on or near each end of the cross bar. The one or more supporting components may also be embodied as one or more wheels arranged on or near each end of the cross bar and thereby it would be easy to move the UAV after it lands on the ground. The one or more supporting components herein may be made from a variety of materials, such as metal or plastic material. In some embodiments, the one or more landing members may be made from vibration-absorptive material, such as artificial material, for reducing or counteracting vibrations generated when the UAV is landing.

In some embodiments, the support member may include a pulling mechanism which optionally includes an elastic element 344 and a fastener 345. The fastener may be mounted on the shaft via bolts or nuts and one end of the elastic element may be coupled to the fastener and another end of the elastic element to the central body of the UAV. The elastic element herein may be implemented as a spring, which may be pulled by a pulley mechanism as arranged on the central body. Thereby, the support members may be folded or retracted when the spring is tightened up after the UAV takes off, and the support members may be opened or stretched out when the UAV is about to land on the ground. The elastic element herein may also be implemented as a piston whose reciprocating motion may drive the support member to open or close relative to the central body.

In some embodiments, to avoid view obstructions caused by the support members, it would be preferred to preset or preconfigure the relative location of the support members to the carrier when the support members are in their closed configuration, that is, during the flight of the UAV. In view of this, in some embodiments, the length of the cross bars may be decreased such that they may not come in the field of view of the imaging device. In some embodiments, instead of using the cross bars, more shafts are applied to directly support the UAV, for example, three, four, or more shafts symmetrically distributed around the central body of the UAV. In some embodiments, the pulling mechanism may pull the shaft to be angled at 100, 105, 110, 115, 120 or more degrees with respect to the carrier, such as with respect to the lower parts of the guides below the central body.

In some embodiments, instead of using the one or more support members separated from the propulsion units, one or more support components that are coupled to the propulsion units may be applied to support the UAV when it lands on the ground. The one or more support components may be situated on any suitable portions of the some or all of the frame assemblies, e.g., near the propulsion units, such as under the propulsion units. The one or more support components herein may be static, for example, secured under the propulsion units. Alternatively, the one or more support components may be moveable respect to the propulsion units or the frame assemblies, such as by sliding, rotating, folding, pivoting, extending, shrinking and the like.

The central body of the UAV as described herein may be used to support a carrier 36 and a payload 37. The carrier may be coupled to any suitable portions of the central body, such as the bottom or underside of the central body. The carrier may be attached to a side or upper surface of the central body. In some instances, the carrier may pass through a cavity of the central body. The carrier may be attached to an inner surface of the cavity of the central body. For instance, if the cavity includes a cut-out within a polygonal shape, the carrier may pass through the cut-out portion and/or contact the sides of the cut-out. A coupling between the carrier and the central body may be a rigid or solid coupling such that the carrier does not move relative to the central body. In some instances, the coupling herein may be a flexible coupling that may permit some movement between the carrier and the central body. The carrier may be permanently fixed to the central body, or the carrier may be detachable from the central body.

In some embodiments, the carrier 36 may have two guides 361 and 362, which are substantively parallel to each other. The guides herein may be embodied as different forms, such as bars or rods, which may be stretchable and thus are easy for carry and packing up. Any number of guides may be provided, including but not limited to, one, two, three, four, five, six, or more guides. The guides may be arranged on any suitable parts of the central body. In some embodiments, the guides may be vertically fixed to an internal side of the central body by means of various approaches, such as welding, soldering, riveting, bolting fastening, etc. One or more of the guides may have one or more actuation assemblies 363 for driving the payload to move along the guides such that the payload may be positioned freely relative to the UAV, or any component of the UAV. This may allow the payload to freely traverse above or below the central body and/or the propulsion units. In some embodiments, the actuation assembly may be implemented by a synchronous belt assembly 39. The synchronous belt assembly arranged on the guide may drive the payload to move along the guides using one or more motors mounted along the guide. The one or more motors may be mounted at the bottom of the guide, the top of the guide, or anywhere between the top and bottom of the guide.

It should be noted that the guides as illustrated herein are only presented as examples, and a skilled person in the art would understand, based on the teaching presented herein, that the carrier may be implemented by other structures. For example, there may be arranged one or more additional guides, which are perpendicular and connected to the existing guides. In this case, the carrier may permit the payload to move horizontally relative to the central body or the propulsion units of the UAV, thereby obtaining flexible movement of the payload about the different directions.

The payload as driven by the carrier in FIG. 3 is depicted as an imaging device, such as a camera, which may be capable of pointing downwards or upwards relative to the central body, thereby performing low angle shooting and high angle shooting, respectively. The camera may also aim sideways. The camera may be configured to rotate relative to the central body (e.g., via a gimbal or other mounting platforms) in order to capture images from a plurality of viewing angles. The payload may be configured to connect to the guides via a gimbal 38, e.g., a 3-axis gimbal as depicted. The camera is provided by way of example only, and other types of payloads may be provided. The gimbal may be a one-axis gimbal, two-axis gimbal, three-axis gimbal, or any other type of gimbal. In alternative embodiments, the camera may remain at a fixed orientation while being able to translate relative to the UAV.

While the gimbal is shown as being located below the UAV, dependent on a mounting position of the carrier, the gimbal disclosed herein may be mounted on an upper surface of the UAV, a lower surface of the UAV, above or below a central body of the UAV, above or below a peripheral portion of the UAV, and the like. Therefore, in some embodiments, another gimbal coupled to the imaging device may be arranged on the top ends of the carrier and therefore two imaging devices are arranged on the upper and lower surfaces of the UAV, respectively. In some embodiments, one, two, three, or more payloads may be capable of traversing a carrier. The payloads may traverse the carrier simultaneously. The payloads may or may not be able to pass one another along the carrier.

The gimbal may comprise a single actuator or a plurality of actuators 381, 382 and 383 configured to provide rotation of the payload about one or more axes of rotation and stabilize the movement of the payload. In some embodiments, the gimbal may be adapted to control the state of the payload (e.g., position and/or orientation) relative to the UAV. For example, the gimbal may be configured to move the payload relative to the UAV (e.g., with respect to one, two, or three degrees of translation and/or one, two, or three degrees of rotation) such that the payload, such as the camera, maintains its position and/or orientation relative to a suitable reference frame regardless of the movement of the UAV. The reference frame may be a fixed reference frame (e.g., the surrounding environment). Alternatively, the reference frame may be a moving reference frame (e.g., the UAV or a payload target). For instance, the payload may be stabilized relative to a fixed reference frame and maintain substantially the same orientation, even when the UAV is flying around. In some instances, the effect of vibrations or jitter may be reduced or removed.

Figure 5:
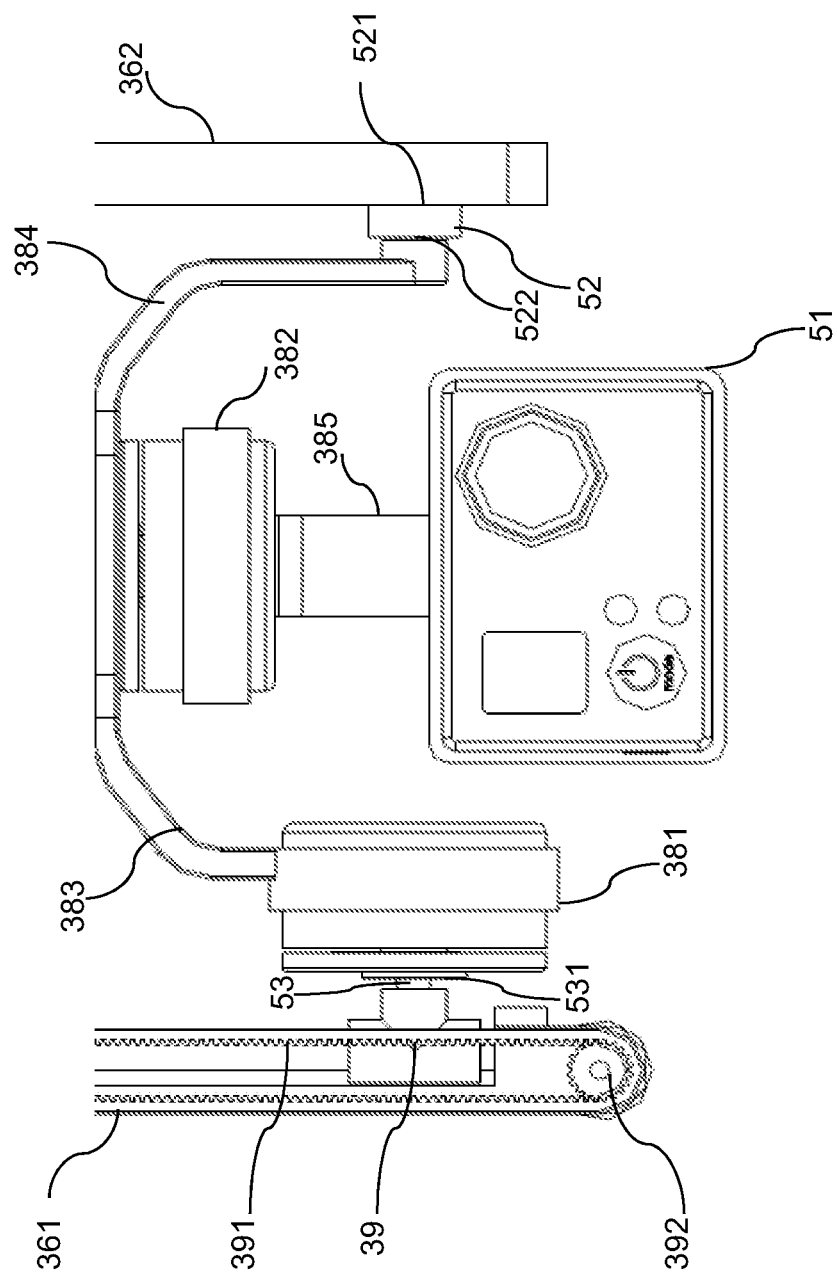
FIG. 5 is a closer view of the region "I" of FIG. 4 in accordance with embodiments of the invention.

In some instances, the gimbal may include one or more frame assemblies 384, 385 and 386 as shown in FIG. 5. The frame assembly may provide structural support for the payload. The frame assembly may include individual frame components, some of which may be movable relative to one another. The frame components may rotate relative to one another. The one or more actuators (e.g., motors) 381, 382, 383 of the gimbal may actuate movement of the individual frame components. The actuators may permit the movement of multiple frame components simultaneously, or may be configured to permit the movement of a single frame component at a time. The movement of the frame components may produce a corresponding movement of the payload. For example, the actuation assembly may actuate a rotation of one or more frame components about one or more axes of rotation (e.g., a roll axis, a pitch axis, or a yaw axis). The rotation of the one or more frame components may cause a payload, e.g., the imaging device, to rotate about one or more axes of rotation relative to the aerial vehicle.

In some embodiments, the rotation order of the payload device is selected to allow the payload device to be rotated without the problem of "gimbal lock" under ordinary operational circumstances for the payload device, such as when pointing straight down. For example, in one embodiment, the rotation order may be pitch, roll and yaw from the innermost to outermost rotational axis. In another embodiment, the rotation order may be pitch, roll and yaw from the outermost to the innermost rotational axis. Any rotation order (e.g., pitch/yaw/roll, roll/pitch/yaw, roll/yaw/pitch, yaw/roll/pitch, or yaw/pitch/roll from outermost to the innermost rotational axis, or from innermost to outermost rotational axis) of the payload device may be contemplated.

Figure 4:
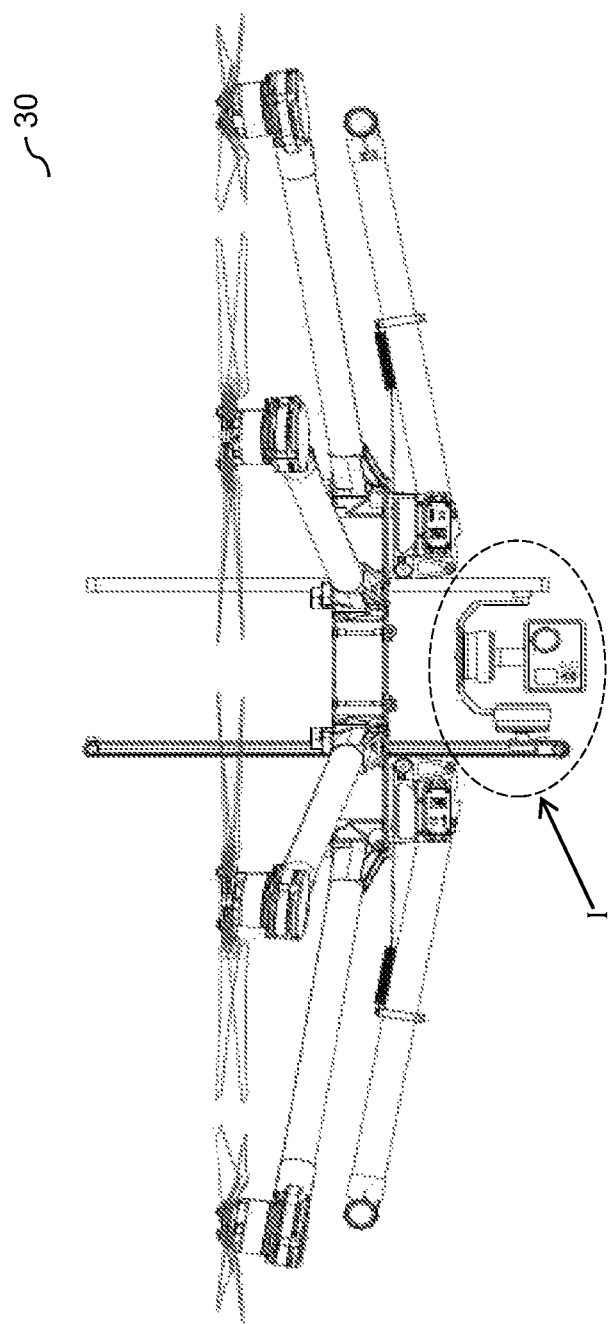
FIG. 4 is a front view of the UAV of FIG. 3 with a payload in a bottom position in accordance with embodiments of the invention.

FIG. 4 is a front view of the UAV 30 of FIG. 3 with a payload in a bottom position in accordance with embodiments of the invention. A payload, such as an imaging device as depicted, may be connected to guides of the carrier through a gimbal, which is enclosed as a region "I" via a dotted oval. As discussed previously, the gimbal, (e.g., a 3-axis gimbal as illustrated herein), may support rotation of the imaging device about one, two, three, or more axes. In the meantime, based on the implementation of the exemplary synchronous belt, the imaging device may be pulled by the synchronous belt to reach any suitable positions along the length of the guides. To further set forth the connection relationship and working principle, a discussion will be made with reference to FIG. 5.

FIG. 5 is a closer view of the region "I" of FIG. 4. A payload 51 (e.g., camera), may be couple to a gimbal. As discussed before, the gimbal herein may be a 3-axis gimbal and thus may comprise three actuation assemblies, such as the actuation assembly 381, the actuation assemble 382 and the actuation assembly 383. Based on this coupling, the payload may be able to rotate about different degrees of freedom, such as about a pitch axis, a yaw axis, and a roll axis. To enable the movement of the payload along the guides, the carrier may provide a first connecting element 52 and a second connecting element 53. The first connecting element may connect the carrier to a first guide 362 and a second connecting element may connect the carrier to a second guide 361.

In some embodiments, one side 521 of the first connecting element 52 that is to be coupled to the first guide may be configured to have one or more protrusions, such as a tab, a block, or a gear, that may snap fit with an internal groove of the guide and move along the length of the internal groove. The internal groove of the guide may have the same length as the guide. Alternatively, the length of the internal groove may be shorter than the length of the guide. The one or more protrusions may mate with the groove such that the first connecting element engages closely with the guide and cannot fall or slide out the guide when the imaging device, together with the gimbal, moves along the guide. The other side 522 of the first connecting element may be coupled to the gimbal (e.g., frame assembly 384). For example, the first connecting element may be threadedly connected with the frame assembly of the gimbal. The first connecting element may be connected to the frame assembly of the gimbal in a manner that may allow the frame assembly to rotate with respect to the first guide.

One side 531 of the second connecting element 53 may be coupled to the gimbal (e.g., actuation assembly 831) and another side 532 of the second connecting element may be coupled to the second guide. The second guide may optionally have a synchronous belt assembly. The second connecting element may be connected to the synchronous belt assembly. A coupling between the second connecting element and the synchronous belt assembly may be carried out by multiple possible approaches, such as welding, soldering, riveting, bolting fastening, etc.

The synchronous belt assembly may comprise a synchronous belt 391. The synchronous belt may be a toothed belt that can engages with a toothed gear wheel 392. The gear wheel may be driven to rotate by an actuation assembly, such as a motor, e.g., the actuation assembly 363. The actuation assembly may be arranged on any suitable location of the guide. For example, the actuation assembly may be arranged on a front side or a back side of the guide, as illustrated in FIG. 3. As an alternative, the actuation assembly may be arranged on the top end of the guide relative to the central body of the UAV, rather than on the bottom end of the guide as illustrated in FIGS. 3 and 4, or anywhere along the length of the guide. To affect the smooth rotation of the synchronous belt, another gear or a driving wheel 393 may also be arranged on the other side of the guide, for example, one shown in FIG. 3 at the top end of the guide. Any number of driving wheels at any location may be provided.

The toothed belts, pulleys or gears discussed herein may be molded from any suitable synthetic material, particularly for the gearings of toothed belt drives for motors. This may considerably reduce the cost of the drives as compared with the same devices using metal gears and may further have an advantage of reducing to a minimum the wear of the toothed belt and consequently obtain the advantage of a longer life of the mechanical assembly.

The synchronous belt assembly as described herein is only for illustrative purposes and a person skilled in the art can understand that other synchronous belt arrangements may also be applicable to effect the movement of the payload relative to the central body or propulsion units of the UAV. The actuation assembly that is used to run the synchronous belt can be arranged at any suitable location of the guides. For example, it may be arranged at either end of a single guide. Further, irrespective of a potential cost and complexity, a further synchronous belt could be used at an opposite guide. Therefore, a better balance may be achieved and the payload may be moved more quickly and easily. When actuation assemblies are provided on multiple guides, they may be synchronized to cause both ends of the payload to move at the same rate. For instance, both a first guide and a second guide may be have actuators that operate at the same speed to drive belt arrangements at the same speed and direction, which enable a payload supported by both guides to traverse the guides without experiencing substantially rotation caused by the guides.

Further, the length of the synchronous belt, the number of teeth of the driving wheel, the size of the driving wheel, or the power of the actuation assembly may be purposefully predetermined or set when considering a moving distance or a moving velocity of the payload. For instance, when a high speed of movement of the payload is needed, an actuation assembly with a relatively high power should be applied to provide more energy for the driving wheel such that the synchronous belt may be rolled more quickly. Again, when a precise movement of the payload is required, a driving wheel with a small diameter may be applied such that the movement of the payload along the guide could be accurately controlled. Therefore, the synchronous belt arrangement as discussed above may be designed by taking one or more of the above factors into account. Alternatively or in combination, the synchronous belt arrangement described herein may comprise a mounting structure coupled to the synchronous belt and the mounting structure is configured to securely couple the gimbal to the guides of the carrier, for example, via mechanical fasteners, adhesives, or one or more mating connections.

Figure 6:
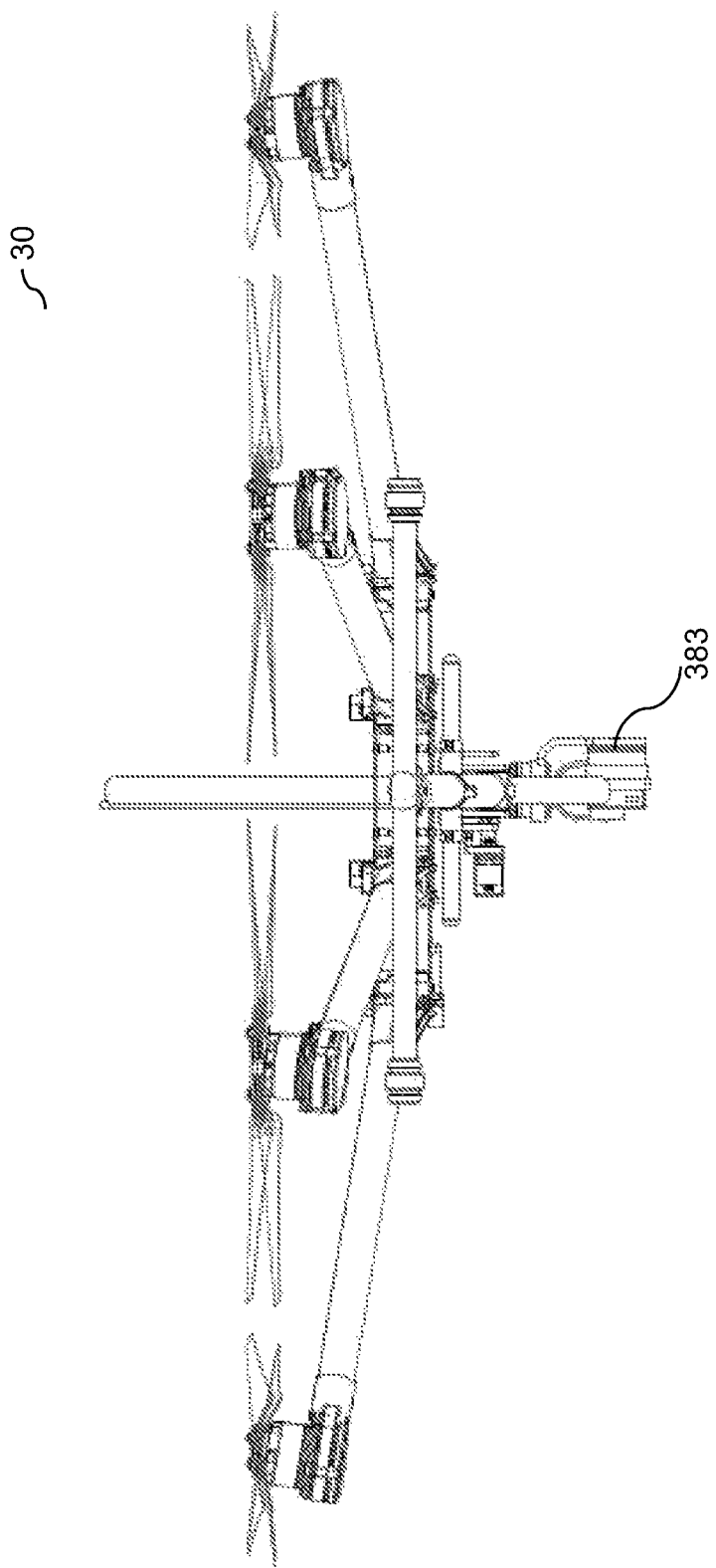
FIG. 6 is a side view of the UAV of FIG. 3 with a payload at the bottom in accordance with embodiments of the invention.

FIG. 6 is a side view of the UAV of FIG. 3 with a payload at the bottom in accordance with embodiments of the invention. It can be seen that the payload (e.g., an imaging device) may be rotated around a roll axis due to the actuation assembly 383 of the gimbal as arranged at the back side of the imaging device. While the image device is located below the central body and the propulsion units of the UAV, it may perform low angle shooting without a visual block caused by the central body and the propulsion units. However, due to this orientation, it is not ideal for the imaging device to perform high angle shooting since an image of the central body or the propulsion units may appear in an optical viewfinder of the imaging device when the imaging device is aimed upwards, especially when the rotation of the imaging device driven by the gimbal around a pitch axis reaches a certain degree. To avoid such types of the visual interference, the carrier according to the embodiments of the invention may permit the payload to move upwards above the central body or the propulsion units. Therefore, the high angle shooting as performed by the payload will be unobstructed. The payload may move above or below the central body as needed to collect unobstructed images or other data.

Figure 7:
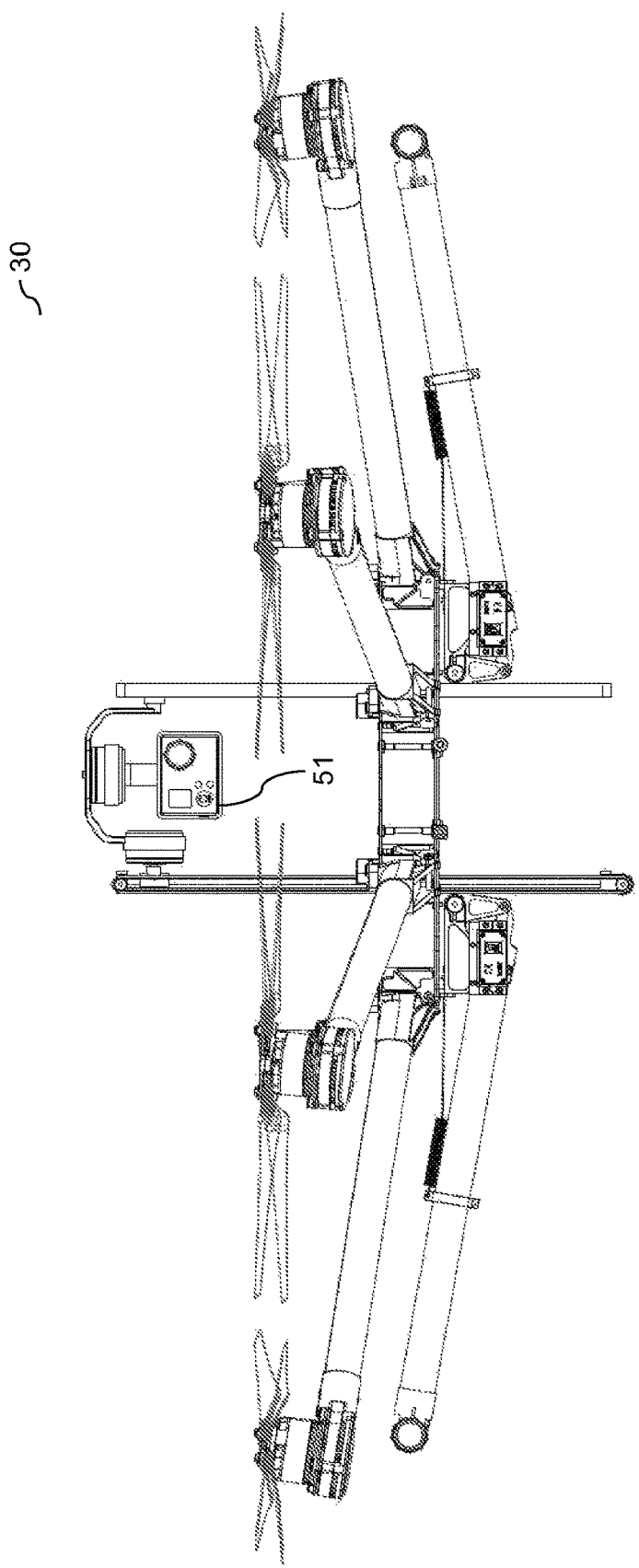
FIG. 7 is a front view of the UAV of FIG. 3 with a payload at a top position in accordance with embodiments of the invention.

FIG. 7 is a front view of the UAV of FIG. 3 with a payload at a top position in accordance with embodiments of the invention.

A payload as supported by a carrier has been moved along the guides of the carrier to be at or near the top end of the guides. The payload may be moved by an actuation assembly, such as a synchronous belt. The translation of the payload along the guides in some embodiments of the invention may be configured in many aspects. The potential configurations may include one or more options for enabling a translation of a payload relative to the UAV, disabling a translation of a payload relative to the UAV (e.g., a central body or propulsion units of the UAV), setting one or more translation directions for a payload translating relative to the UAV, and setting one or more translation distances for a payload translating relative to the UAV. These configurations may be predetermined or preset according to the user's preference or application requirements. Various options may be implemented with aid of a user interface displayed on the payload, arranged on a control panel on the UAV, or visually displayed on a remote controller.

An option may be selected that may enable translation of the payload. In such a scenario, the payload may be moved along the guides of the carrier. This may occur in response to a user instruction or may occur automatically. In some instances, the payload may move at a given time (e.g., at 4:00 PM or any other specified time), or may move after a given period of time (e.g., one or two minutes after the UAV launches into the air). The payload may move in accordance with a given schedule of motions for the camera along the guides. The schedule may be provided in relation to absolute time, or in relation to an action of the UAV, such as turning on, or taking off. In some instances, the payload may move in response to a sensed condition of the environment, the UAV, the carrier, or the payload. For example, the payload may start off on a bottom side of the carrier. A sensor on the UAV may detect motion occurring above the UAV. The camera may move above the central body of the UAV to get a better view of what is causing the motion above the UAV.

An option may be selected that may disable translation of the payload. Disabling translation of the payload may prevent the payload from moving along the guides during operation of the UAV and/or flight of the UAV. In some instances, no automated translation of the UAV may occur. In some embodiments, user inputs to effect translation of the payload may be disabled or ignored. Thus, even if a user provides an input, via a remote control, to cause the payload to translate, the payload may not translate when the translation is disabled. This may or may not be used in conjunction with disabling rotation of the payload. In some instances, while translation of the payload is disabled, the rotation of the payload may be permitted. For instance, a user input to control rotation may be allowed, or automated rotation may occur. In other instances, disabling translation may result in automatically disabling rotation of the payload. This may be referred to disablement of all movement of the payload relative to the UAV. Alternatively, an option to disable or not disable the rotation of the UAV may be selected in parallel. In some instances, the reverse may occur. For instance, rotation of the payload may be disabled, while permitting translation of the payload.

The enabling and/or disabling of translation of the payload may occur in response to a user instruction. In some instances, the user instruction is provided prior to flight of the UAV. In some instances, this may prevent a user from changing the translation setting for the payload during flight of the UAV. Alternatively, the instruction may be provided during the flight of the UAV. The instruction may be provided from a user via a remote controller. In some instances, the instruction may be provided manually by the user directly at the UAV. When an instruction is provided at the UAV, the user may or may not be able to provide a subsequent instruction via the remote controller. In some instances, when the translation disablement is selected during the flight, the payload may temporarily stop and stay at its current position until a further user control instruction is received. This may be advantageous if the current position turns out to be a very good position for shooting some spectacular views. As previously described, the disablement may refer to translation only, rotation only, or both translation and rotation.

In some embodiments, the range and/or direction of movement of the payload may be preset or limited. For instance, a user may provide an input to only allow upward movement of the payload, or download movement of the payload. A user may provide an input to limit the distance the payload can travel along the carrier. The user may also provide an input to limit the locations along the carrier that the payload may traverse (e.g., an upper limit and/or lower limit).

The translation directions may be controlled prior to or during the flight. For example, prior to the flight, depending on the current location of the payload, the user may set the payload to move in an opposite direction so that the high angle shooting or the low angle shooting may be obtained through a single round of movement. Further, the user may configure the payload to move to the original location, for example, the bottom end of the guide or the top end of the guide relative to the central body prior to the flight. During the flight, the user may also be able to control the translation direction of the payload with respect to the central body or the propulsion units. For example, if the low angle shooting is preferred, the user may wirelessly control the payload to move to an upper part of the guide. This could be done by displaying to the user a user interface in which "up" and "down" directions are respectively displayed for user selection. Further, this also could be done by a joystick arranged on the remote controller or by a voice input via a speech recognition technique.

The user may also configure one or more translation distances for the movement of the payload. In some instances, directed to a verity of shooting target or different shooting requirements, the user may configure the payload to move more or less. For example, for those shooting targets that are far above or below the UAV, the translation distances of the payload may be set higher than normal since the payload would move a longer distance to reach the respective opposite end of the guide, thereby obtaining the low angle shooting or high angle shooting. Further, dependent on whether the obstructed view caused by the propulsion units is accepted or not, the translation distance may be preset as a long distance or a short distance (e.g., different categories or specified numerical ranges). For example, if the visual interference by the propulsion units is unacceptable, then the translation distance may be preset as a long distance. In contrast, if the visual interference by the propulsion units is not strictly prohibited, then a short translation distance may be predetermined or preset. Therefore, the movement of the payload may be controlled in an efficient way.

In some embodiments, shooting or photography operations as performed by the payload may be predetermined or preset prior to the flight or during the flight. For example, the user may configure the imaging device, as a specific type of the payload, to keep shooting while translating. Conversely, the user may configure the imaging device not to shoot while translating, i.e., stop shooting while translating. In some instances, the user may configure the imaging device to keep shooting within a certain translation distance. In contrast, the user may configure the imaging device not to shoot, i.e., stop shooting, within a certain translation distance. Whether the payload device is operating may depend on translation distance, translation speed, translation acceleration, translation distance, sensed environmental conditions, sensed UAV state, sensed carrier state, sensed payload state, user instructions, and/or any other factor. In this manner, the shooting operation may be flexibly controlled and the battery life could be extended.

The moving distance, such as the translation distance, of the payload may be monitored for better controlling. In some instances, one or more sensors may be utilized to determine translation information, such as translation distance, direction, or movement. In some instances, information from one or more actuators may be used to determine the information. For example, power output to a motor, power output from a motor, length of time of operation of motor, speed of rotation of motor, and/or direction of rotation of a motor that may effect the translation may be used to determined translation information. In some instances, the carrier may be provided with one or more Hall effect sensors for measuring the translation distance of the payload relative to the central body. For example, as known to those skilled in the art, the Hall sensors may be used in the tachometric survey and counts. Based on the rotating counts performed by the Hall sensors on the motor, the running distance of the synchronous belt may be determined and therefore the moving distance of the payload may be resulted. In some other instances, the carrier may provide one or more digital vernier callipers to measure the moving distance of the payload relative to the central body. The resulted measured distance may be transmitted to the user. In some embodiments, the measured distance may be displayed on a displaying device of the remote controller such that the user may learn the movement of the payload in time. For example, the measured translation distance may be graphically or visually displayed to the user of the UAV, e.g., a trajectory upon which the movement of the payload is graphically displayed in real time.

In some embodiments, the payload may be permitted to translate in the vertical direction by at least 150 mm and the payload may be permitted to translate in the vertical direction at a rate of at least 15 mm/s.

When the payload reaches the top position of the carrier, it may perform corresponding operations. For example, when the payload is embodied as an imaging device, it may perform shooting or photography operations as exemplarily shown in FIG. 7. As mentioned before, based on the driving force provided by the gimbal via one or more actuators (e.g., motors), the imaging device may rotate about one or more axes of rotation. For example, based on the actuation of the a plurality of actuators, the imaging device may be capable of rotating about one or more of a pitch axis, a yaw axis, and a roll axis. When the imaging device is rotating about the yaw axis, the images of the carrier may run into the view angle of the imaging device, for example, the guides of the carrier obstructing the view angle of the imaging device, which is not desirable for shooting. To this end, in some embodiments, the imaging device may be able to rotate about the pitch axis, for example, based on the rotating actuation of the actuator 382, such that the guides of the carrier may not block the view angle of the imaging device. For example, the imaging device may be flipped relative to the guides of the carrier such that it may be positioned at the top. Therefore, it is possible to exclude the visual obstructions imposed by the guides of the carrier. This flipping operation may be performed in response to the detection of the image of the carrier in the view angle of the imaging device. Alternatively, the flipping operation may be performed automatically once the payload reaches the top position of the carrier, e.g., the top ends of guides.

Figure 8:
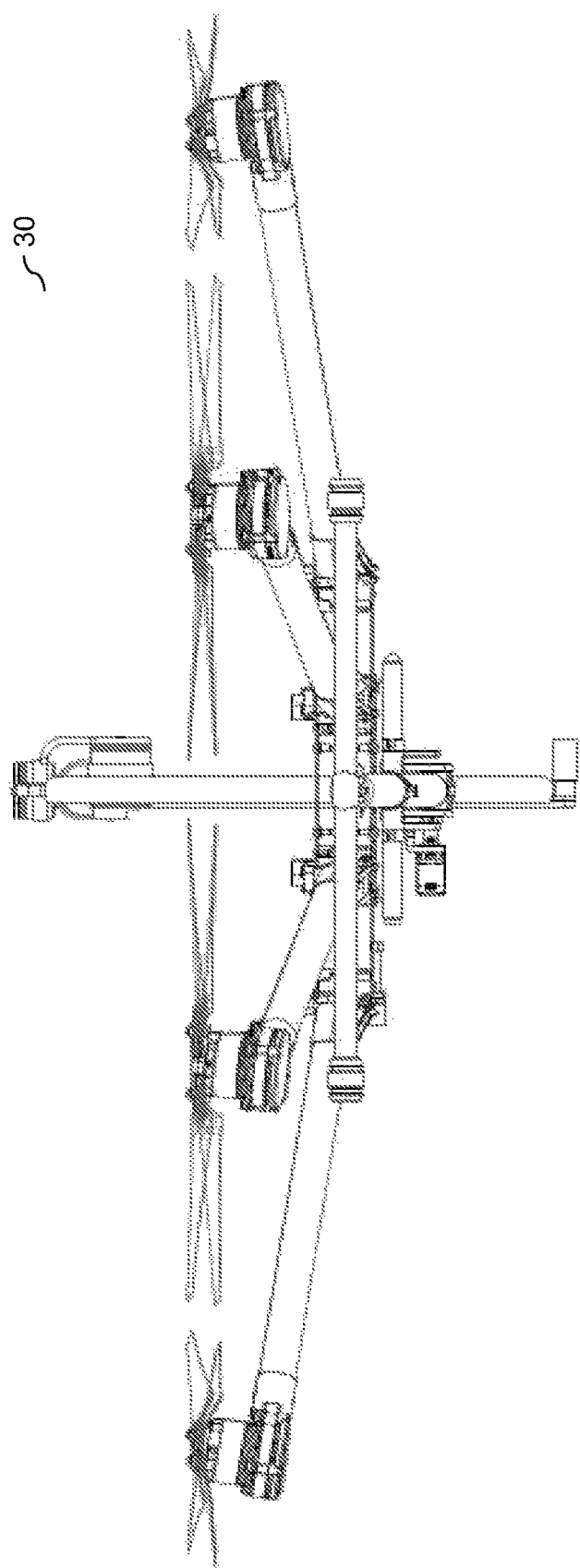
FIG. 8 is a side view of the UAV of FIG. 7 in accordance with embodiments of the invention.

FIG. 8 is a side view of the UAV of FIG. 7 in accordance with embodiments of the invention. As can be seen from FIG. 8, the carrier permits the payload to pass through the central body of the UAV, and below and above the UAV or the propulsion units of the UAV. The payload may pass through the UAV central body in a manner such that at a given point in time, the payload is laterally surrounded by the central body. The payload may be surrounded around 360 degrees, or 180 degrees or more. Once the payload reaches an upper position from a lower position, the payload may perform corresponding tasks. As mentioned before, when the payload is an imaging device, it may begin performing low angle shooting by rotating upwards about a pitch axis. Thereby, a different shooting angle from the conventional shooting, which generally performs high angle shooting, could be achieved. For example, if the shooting target is a parachuting enthusiast floating in the air, then the imaging device may take a photo or video for the enthusiast under the parachute if the UAV is flying below the enthusiast. In some embodiments, based on the real-time feedback data, the user holding the remote controller may control the payload to adjust its position, for example, moving a little downwards, or moving in a vertical direction while rotating in different axes, thereby recording image or video data with high quality and different views. In some embodiments, a combination or fusion of the images respectively obtained by the high angle shooting and the low angle shooting would engender a panoramic picture or image, thereby obtaining a high-quality image with more comprehensive details.

Figure 9:
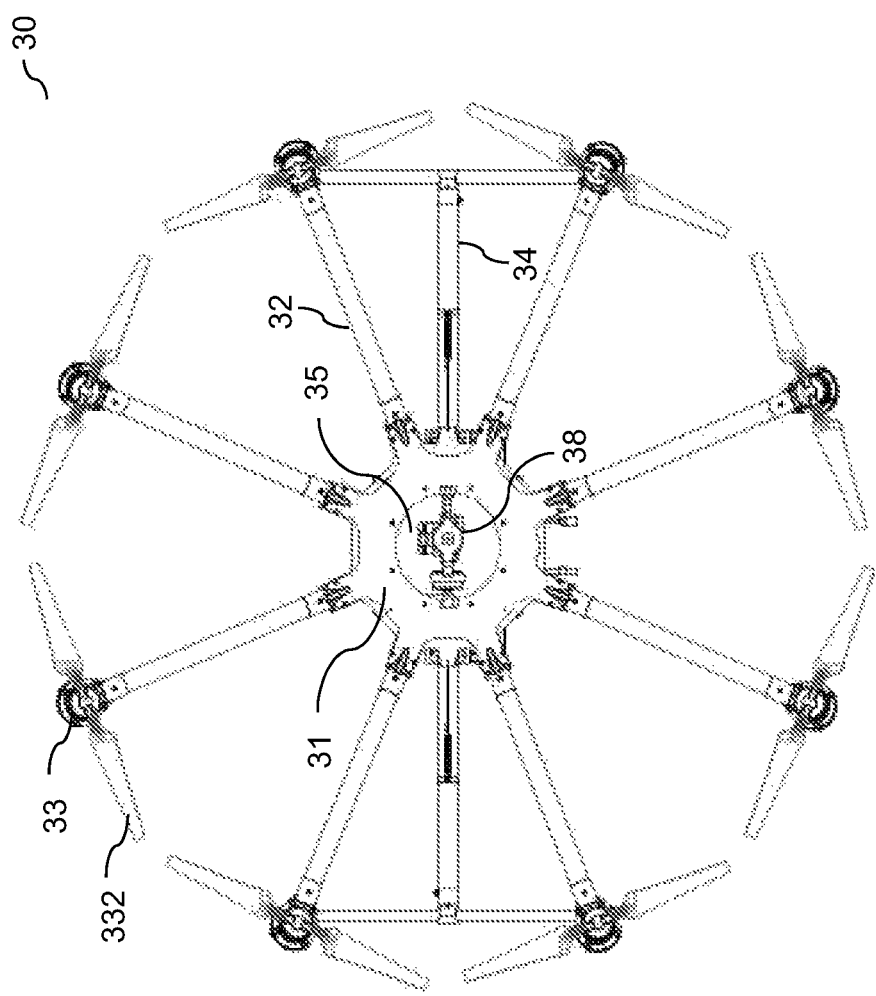
FIG. 9 is a vertical view of the UAV of FIG. 3 in accordance with embodiments of the invention.

FIG. 9 is a vertical view of the UAV of FIG. 3 in accordance with embodiments of the invention. As can be seen from FIG. 9, the exemplary UAV comprises eight propulsion units which respectively disposed on the central body using respective extending arms or frame assemblies. Any number of propulsion units may be provided. The propulsion units may optionally be radially disposed. In some instances, the propulsion units may be equidistant from the central body. The propulsion units may supported by frame assemblies that are at the same angles relative to one another laterally.

Further, two support members may also be coupled to the central body for supporting the UAV when it is resting on the ground. The support members may be landing stands configured to bear weight of the UAV when the UAV is on the ground. The support members may have a sufficient length that may prevent the carrier and/or payload from touching the ground when the support members are in a lowered position to support the UAV.

The carrier, according to the embodiments of the invention, may be arranged at the central area of the central body. As illustrated, one, two, or more guides of the carrier may be vertically fixed to the periphery of the central cavity of the central body and are parallel to each other. The payload, e.g., an imaging device, may be carried by the gimbal coupled to the guides of the carrier. Therefore, the payload according to the embodiments of the invention may move along the length of the guides while rotating or without rotating. Further, as discussed before, a terminal, e.g., a remote controller, may be provided accordingly to control the positioning of the payload on the UAV. In some embodiments, the remote controller may comprise one or more processors configured to generate a user control instruction for controlling the UAV as illustrated in FIGS. 3-9. The user control instruction may include enabling the movement of the payload, disenabling the movement of the payload, causing the movement of the payload in a given direction, for a given period of time, stopping the movement of the payload, resuming the movement of the payload, stopping shooting during the movement, stopping, starting, or resuming shooting within a predetermined distance. The remote controller may further comprise a communication unit, such as a wireless transceiver, for transmitting the user control instruction as discussed above to the UAV. Correspondingly, the UAV may include a communication unit, such as a wireless transceiver, to receive such a user control instruction and may include one or more processors to process this user control instruction, thereby causing the payload to perform the corresponding actions, such as moving above or below the central body, moving above or below the propulsion units, moving vertically, moving horizontally, rotating about one or more exes of rotation, and so on.

Figure 10:
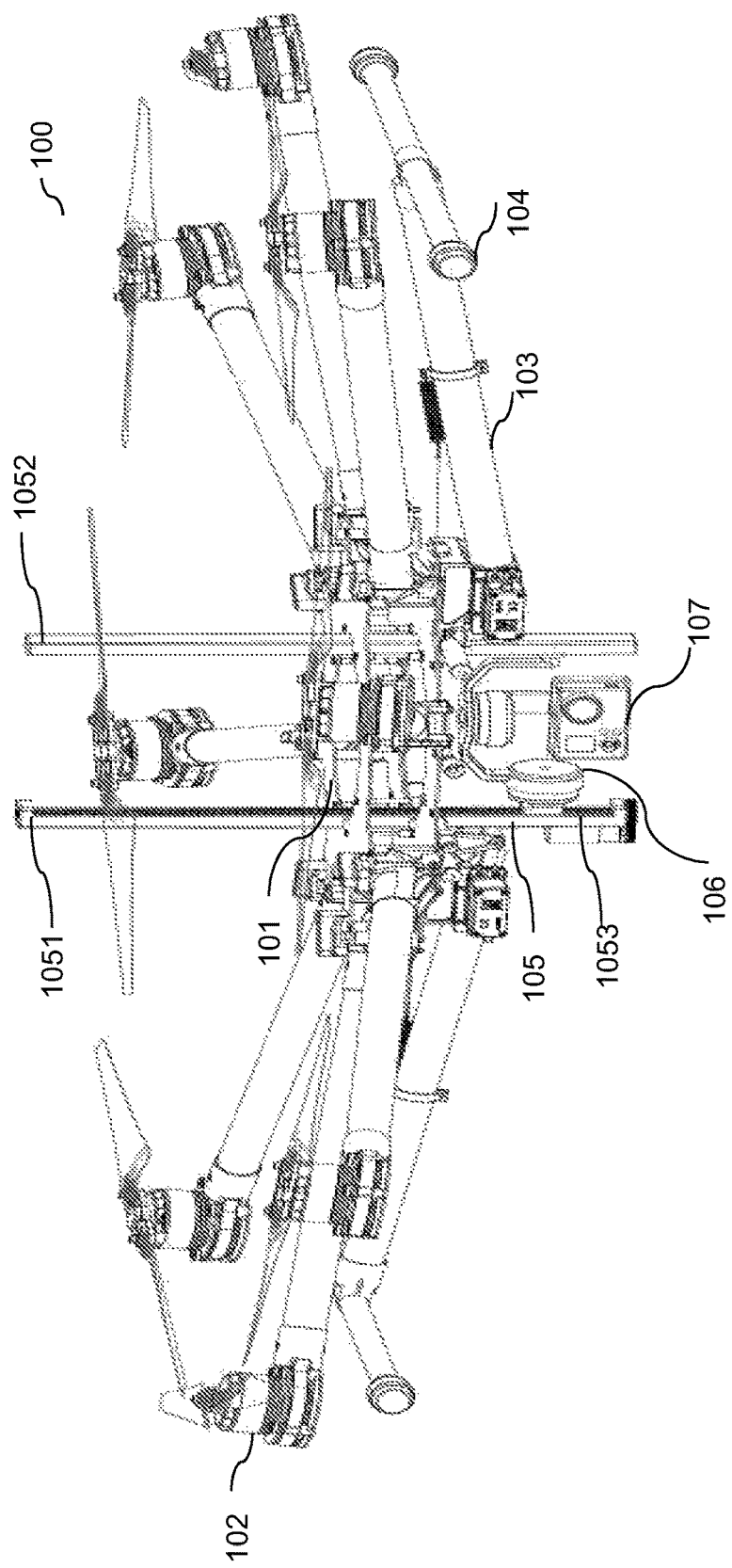
FIG. 10 is another example of a UAV with a carrier in accordance with embodiments of the invention.

FIG. 10 is another example of a UAV 100 with a carrier in accordance with embodiments of the invention.

As illustrated in FIG. 10, the UAV 100 is very similar to the one shown in FIG. 3. For example, the UAV also comprises a central body 101 with a multiplayer structure, one or more propulsion units 102 for propelling the UAV to fly through the air, and two parallel support members 103 with landing gears 104 for the UAV resting on a surface, such as the ground. The distinction between the UAV shown in FIG. 10 and the one shown in FIG. 3 is a different carrier structure. As detailed before with reference to FIGS. 3-9, the UAV discussed therein may comprise a carrier implemented mainly based on a synchronous belt as a specific form of the actuation assembly, thereby permitting the payload to move freely along the guides of the carrier. As an alternative to the synchronous belt, the carrier shown in FIG. 10 applies a guide screw assembly as another specific form of the actuation assembly to drive the payload to move above or below the central body or the propulsion units of the UAV.

In particular, the carrier 105 herein includes two guides 1051 and 1052 that are substantially parallel to each other and on one of the guides, e.g., the guide 1051, is arranged an actuation assembly, which is depicted as a guide screw assembly 1053 including an actuation assembly, such as one or more motors. A gimbal 106 is connected with the guides. For example, one side of the gimbal is connected with the guide of the carrier (e.g., guide 1051) that is arranged the guide screw assembly. Another side of the gimbal is connected with the other guide of the carrier (e.g., guide 1052). The payload 107, which is shown as an imaging device, such as a camera, is coupled to the carrier such that the payload driven by the gimbal may be capable of rotating in one or more degrees of freedom, such as around a pitch axis, a roll axis and a yaw axis, in case the gimbal is a 3-axis gimbal.

Figure 11:
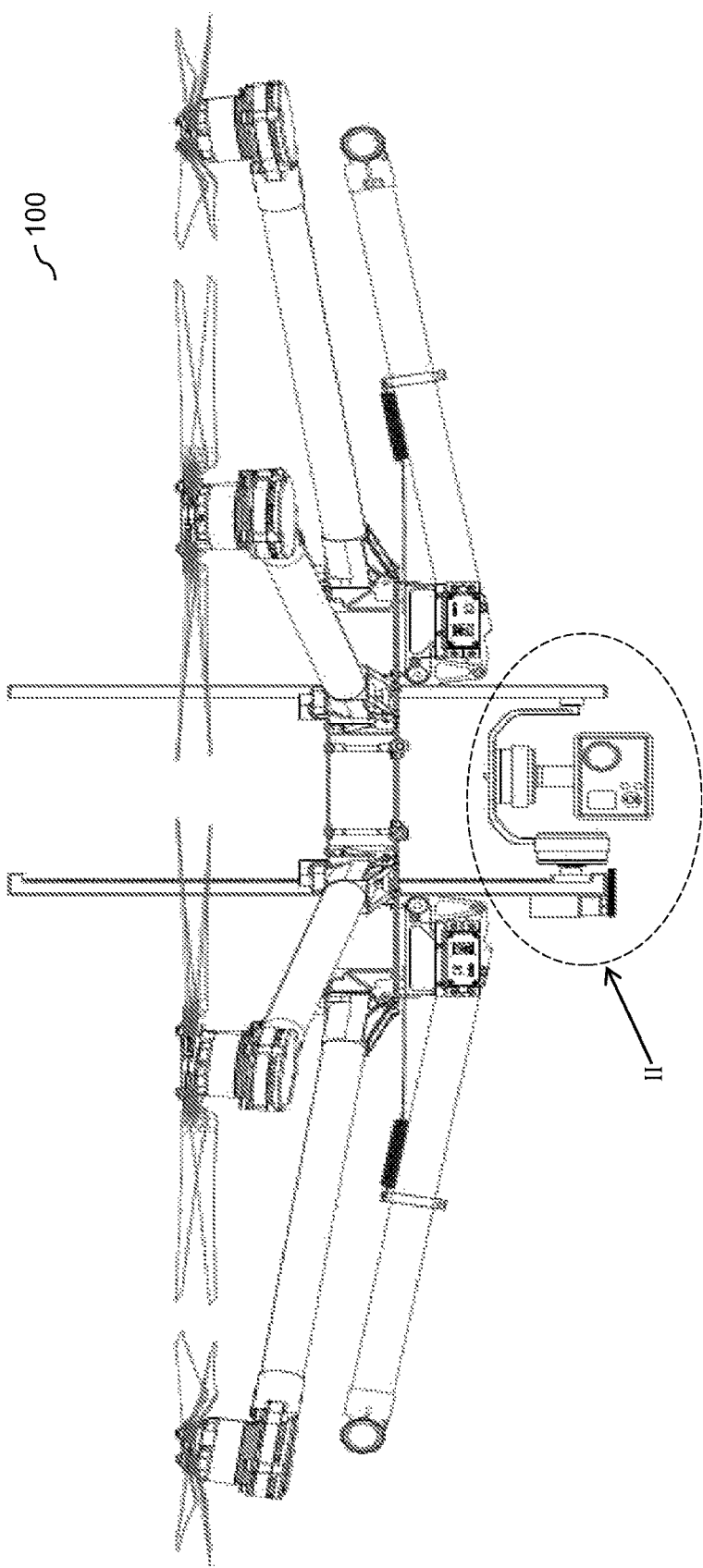
FIG. 11 is a front view of the UAV of FIG. 10 with a payload in a bottom position in accordance with embodiments of the invention.

FIG. 11 is a front view of the UAV 100 of FIG. 10 in accordance with embodiments of the invention. As can be seen from FIG. 11 in the enclosed region "II", the camera 107, as an exemplary form of the payload, is coupled to the gimbal, which is then coupled to the guide screw assembly. Based on the operations of the actuation assembly, the guide screw, which may be nested within the guide of the carrier, may keep rotating and thereby may drive the gimbal to vertically move along the guides until a desired location is reached. The movement of the gimbal in the vertical direction may permit the payload to also move vertically. Therefore, the payload may translate along the guides and therefore move above the central body of the UAV or the propulsion units of the UAV. The following will discuss in detail about the guide screw assembly as shown in the region "II."

Figure 12:
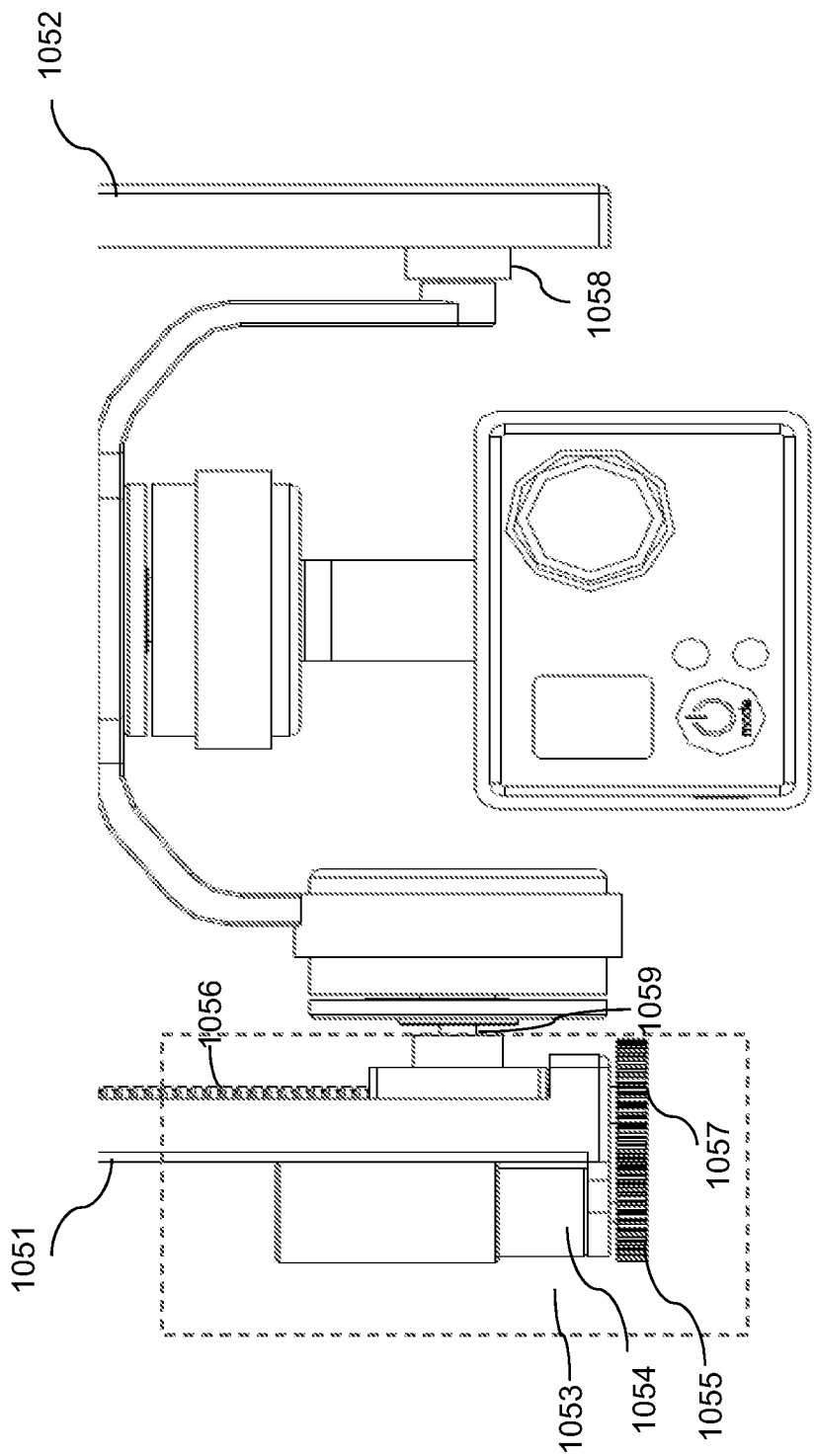
FIG. 12 is a closer view of the region "II" of FIG. 11 in accordance with embodiments of the invention.

FIG. 12 is a closer view of the region "II" of FIG. 11. As illustrated, the carrier comprises two guides 1051 and 1052, which may be embodied as two bars or rods. At either one of the guides, e.g., at the guide 1051, is arranged the guide screw assembly 1053. The guide 1052 may optionally have a guide screw assembly or the guide 1052 may be connected to the guide screw assembly. The guide screw assembly may comprise an actuator 1054, e.g., a motor, to drive a first gear element 1055. The motor as described herein may be embodied as any suitable motor, such as a DC motor (e.g., brushed or brushless) or an AC motor. In some instances, the motor may be adapted to mount and drive one or more gear elements to rotate. To drive a guide screw rod 1056 to run, a second gear element 1057 may be applied. The second gear element is fixed to the guide screw rod and engages with the first gear element through its strew thread. In some instances, the second gear element may be coupled to the guide screw rod through welding, riveting, etc. The second gear element and the guide screw rod may be molded in one piece. To connect the gimbal to the UAV, the carrier may further comprise a first connecting element 1058 and a second connecting element 1059. The first connecting element may have two operation surfaces, one of which may be slidably connected to the guide 1052 by one or more protrusions, and another of which may be rotatably connected to the gimbal. The one or more protrusions herein may be one or more tabs, one or more sliding blocks or one or more pulleys that may be fit in with an internal rim of the guide 1052. The second connecting element 1059 may also have two operation surfaces, one of which may be slidably connected to the guide 1051 (in particular, the guide screw rod 1056) and another of which may be rotatably connected to the gimbal. In some embodiments, there is a screw thread on the second connecting element that may correspond to the screw thread on the surface of the guide screw rod such that the second connecting element may threadedly connect with the guide screw rod. In some embodiments, there may be one or more teeth on the operation surface of the second connecting element that may engage with the screw thread on the guide screw rod. The first and the second connecting elements as discussed herein may be connected to the respective frame assemblies of the gimbal in a manner that may allow the frame assemblies to rotate with respect to the guides of the carrier. Alternatively or in combination, the guide screw arrangements described herein may comprise one or more mounting structures coupled to the guide screw rod and these mounting structures are configured to securely couple the gimbal to the carrier, for example, via mechanical fasteners, adhesives, or one or more mating connections.

When actuation assemblies are provided on multiple guides, they may be synchronized to cause both ends of the payload to move at the same rate. For instance, both a first guide and a second guide may be have actuators that operate at the same speed to drive the guide screw rod at the same speed and direction, which enable a payload supported by both guides to traverse the guides without experiencing substantially rotation caused by the guides.

Based on the above various connections, in operation, the actuation assembly of the carrier (e.g., the motor) may actuate the guide screw rod to rotate. As the guide screw rod rotates, the first and second connecting elements may take the gimbal to move back and forth, for example, moving upwards from the location below the central body of the UAV to the location above the central body. In some embodiments, the gimbal may be translated to pass through the cavity of the central body and reach the opposite end of the guides. Therefore, the payload, when coupled to the gimbal and embodied as an imaging device, may perform multi-angle shooting. For example, when the imaging device is below the central body of the UAV, it may perform high angle shooting. When the imaging device is translated above the central body of the UAV, it may perform low angle shooting. In this manner, there would be no visual interference from the central body or the propulsion units of the UAV since it can be overcome by free movements of the payload. Further, since the gimbal may render the payload rotatable about one or more axes of rotation, the movement of the payload would be more flexible in multiple directions. In some embodiments, one, two, three, or more payloads may be capable of traversing a carrier. The payloads may traverse the carrier simultaneously. The payloads may or may not be able to pass one another along the carrier.

Figure 13:
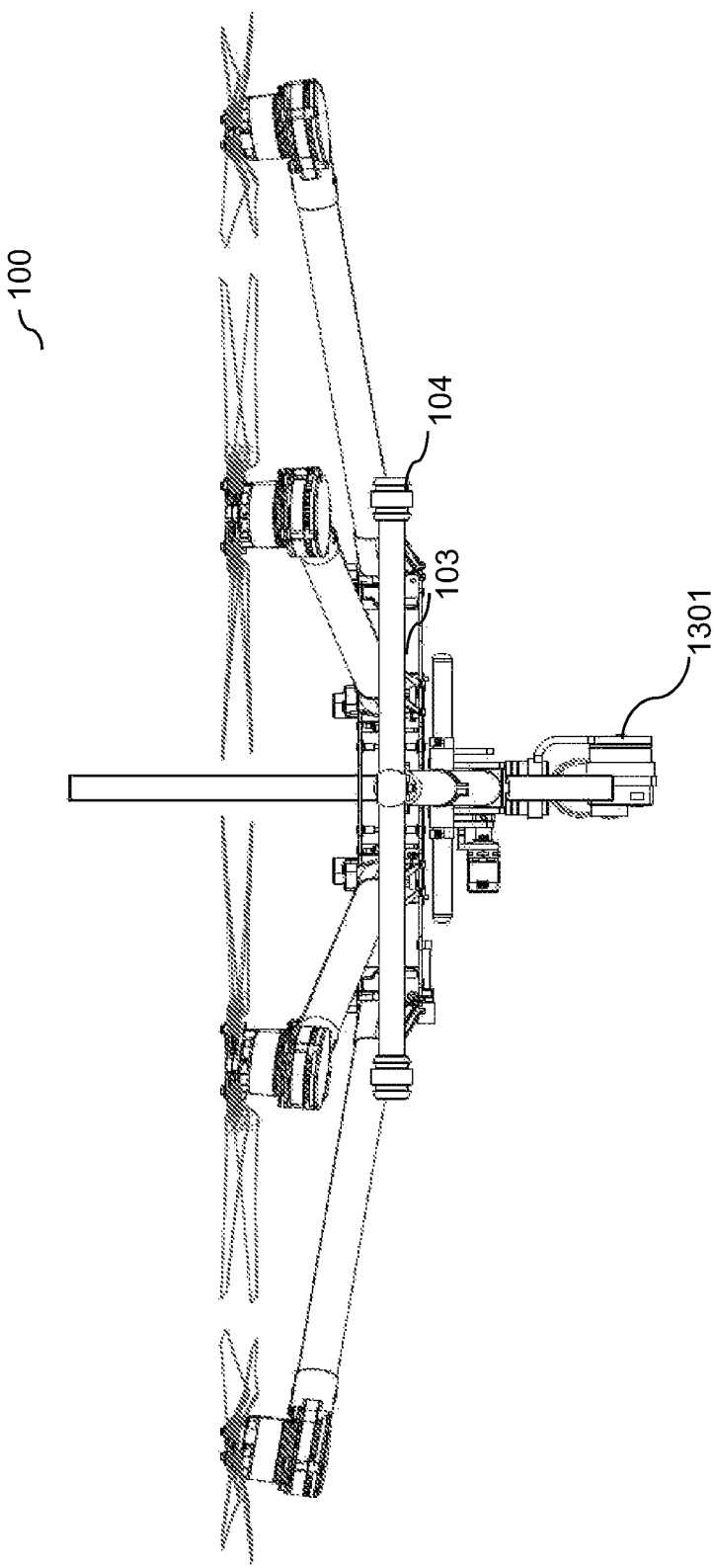
FIG. 13 is a side view of the UAV of FIG. 11 with a payload at a bottom position in accordance with embodiments of the invention.

FIG. 13 is a side view of the UAV of FIG. 11 with a payload at a bottom position in accordance with embodiments of the invention. As can be seen from FIG. 13, an actuation assembly 1301 of the gimbal (e.g., motor) is coupled to the payload, for example, an imaging device. Therefore, the imaging device may be rotated around a roll axis based on the actuation from the actuation assembly. While the imaging device is located below the central body and the propulsion units of the UAV, it may perform low angle shooting without a visual block caused by the central body or the propulsion units. However, it is not ideal for the imaging device to perform high angle shooting since an image of the central body or the propulsion units may appear in an optical viewfinder of the imaging device when the imaging device is aimed upwards, especially when the rotation of the imaging device driven by the gimbal around a pitch axis reaches a certain degree. To this end, the carrier according to the embodiments of the invention may permit, via, e.g., a guide screw assembly as discussed herein, the payload to move upwards above the central body or the propulsion units of the UAV. Therefore, the low angle shooting as performed by the payload will be unobstructed and may be used to supplement the high angle shooting as performed when the payload is below the central body of the UAV. The payload may move above or below the central body as needed to collect unobstructed images or other data. A combination or fusion of the images respectively obtained by the high angle shooting and the low angle shooting would engender a panoramic picture or image, thereby obtaining a high-quality image with more comprehensive details.

Figure 14:
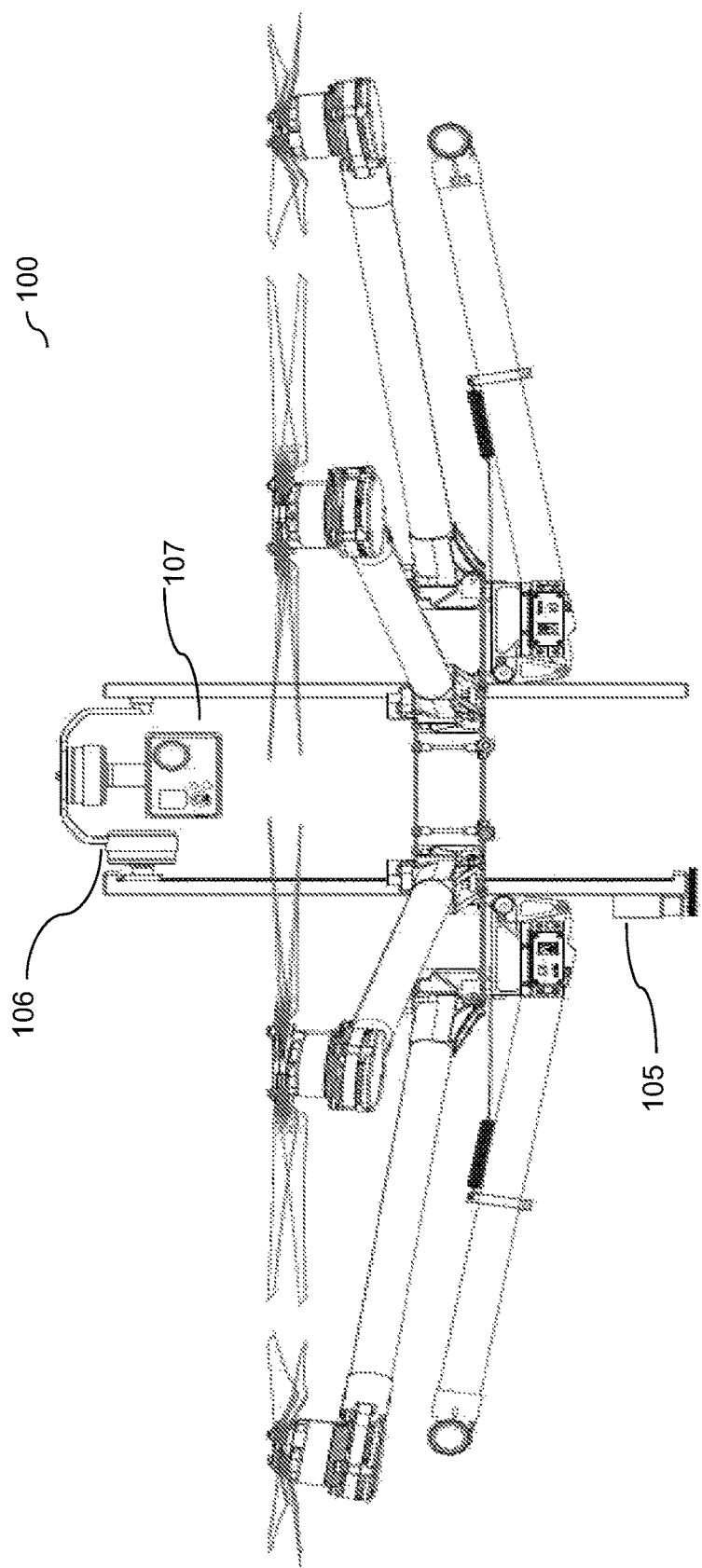
FIG. 14 is a front view of the UAV of FIG. 11 with a payload at a top position in accordance with embodiments of the invention.

FIG. 14 is a front view of the UAV of FIG. 11 with a payload at a top position in accordance with embodiments of the invention.

A payload as supported by a carrier is coupled to a gimbal and moves vertically along the guides to be at or near the top end of the guide screw. The payload may be moved by an actuation assembly, such as a guide screw. The translation herein from the bottom end of the guides to the top end of the guides may be configured by taking into account multiple factors. In some embodiments, the user may be provided with some options to configure whether not to enable or disable the translation, one or more translation directions, and one or more translation distances. Further, the user may choose to configure both the translation and shooting options together. These configurations may be predetermined or preset according to the user's preference or application requirements and may be implemented by a user interface displayed on the payload, arranged on a control panel on the UAV, or visually displayed on a remote controller. In some embodiments, some or all of these configurations may keep valid without user's repetitive input until a change or an amendment is made to the current configuration.

An option may be selected that may enable translation of the payload. In such a scenario, the payload may be moved along the guides of the carrier. This may occur in response to a user instruction or may occur automatically. In some instances, the payload may move at a given time (e.g., at 4:00 PM or any other specified time), or may move after a given period of time (e.g., one or two minutes after the UAV launches into the air). The payload may move in accordance with a given schedule of motions for the camera along the guides. The schedule may be provided in relation to absolute time, or in relation to an action of the UAV, such as turning on, or taking off. In some instances, the payload may move in response to a sensed condition of the environment, the UAV, the carrier, or the payload. For example, the payload may start off on a bottom side of the carrier. A sensor on the UAV may detect motion occurring above the UAV. The camera may move above the central body of the UAV to get a better view of what is causing the motion above the UAV.

An option may be selected that may disable translation of the payload. Disabling translation of the payload may prevent the payload from moving along the guides during operation of the UAV and/or flight of the UAV. In some instances, no automated translation of the UAV may occur. In some embodiments, user inputs to effect translation of the payload may be disabled or ignored. Thus, even if a user provides an input, via a remote control, to cause the payload to translate, the payload may not translate when the translation is disabled. This may or may not be used in conjunction with disabling rotation of the payload. In some instances, while translation of the payload is disabled, the rotation of the payload may be permitted. For instance, a user input to control rotation may be allowed, or automated rotation may occur. In other instances, disabling translation may result in automatically disabling rotation of the payload. This may be referred to disablement of all movement of the payload relative to the UAV. Alternatively, an option to disable or not disable the rotation of the UAV may be selected in parallel. In some instances, the reverse may occur. For instance, rotation of the payload may be disabled, while permitting translation of the payload.

The enabling and/or disabling of translation of the payload may occur in response to a user instruction. In some instances, the user instruction is provided prior to flight of the UAV. In some instances, this may prevent a user from changing the translation setting for the payload during flight of the UAV. Alternatively, the instruction may be provided during the flight of the UAV. The instruction may be provided from a user via a remote controller. In some instances, the instruction may be provided manually by the user directly at the UAV. When an instruction is provided at the UAV, the user may or may not be able to provide a subsequent instruction via the remote controller. In some instances, when the translation disablement is selected during the flight, the payload may temporarily stop and stay at its current position until a further user control instruction is received. This may be advantageous if the current position turns out to be a very good position for shooting some spectacular views. As previously described, the disablement may refer to translation only, rotation only, or both translation and rotation.

In some embodiments, the range and/or direction of movement of the payload may be preset or limited. For instance, a user may provide an input to only allow upward movement of the payload, or download movement of the payload. A user may provide an input to limit the distance the payload can travel along the carrier. The user may also provide an input to limit the locations along the carrier that the payload may traverse (e.g., an upper limit and/or lower limit).

To better control the payload, in some embodiments, shooting or photography operations as performed by the payload may be predetermined or preset prior to the flight or during the flight. For example, the user may configure the imaging device, as a specific type of the payload, to keep shooting while translating. Conversely, the user may configure the imaging device not to shoot while translating. In some instances, the user may configure the imaging device to keep shooting within a certain translation distance. In contrast, the user may configure the imaging device not to shoot (i.e., stop shooting) within a certain translation distance. Whether the payload device is operating may depend on translation distance, translation speed, translation acceleration, translation distance, sensed environmental conditions, sensed UAV state, sensed carrier state, sensed payload state, user instructions, and/or any other factor. In this manner, the shooting operation may be flexibly controlled and the battery life could be extended.

The moving distance, such as the translation distance, of the payload may be monitored for better controlling. This could be done with the aid of one or more sensors. In some instances, one or more sensors may be utilized to determine translation information, such as translation distance, direction, or movement. In some instances, information from one or more actuators may be used to determine the information. For example, power output to a motor, power output from a motor, length of time of operation of motor, speed of rotation of motor, and/or direction of rotation of a motor that may effect the translation may be used to determined translation information. In some instances, the carrier may comprise one or more Hall sensors for measuring the translation distance of the payload relative to the central body. For example, as known to those skilled in the art, the Hall sensors may be used in the tachometric survey and counts. Based on the rotating counts performed by the Hall sensors for the motor, the running distance of the guide screw rod may be determined and therefore the moving distance of the payload may be obtained. In some other instances, the carrier may provide one or more digital vernier callipers to measure the moving distance of the payload relative to the central body. The resulted measured distance may be transmitted to the user in real time or nearly real time. In some embodiments, the measured distance may be displayed on a displaying device of the remote controller such that the user may learn the moving situations of the payload very quickly. For example, the measured translation distance may be graphically or visually displayed to the user of the UAV, e.g., a trajectory upon which the movement of the payload is graphically displayed in real time.

In some embodiments, the rotation order of the payload device is selected to allow the payload device to be rotated without the problem of "gimbal lock" under ordinary operational circumstances for the payload device, such as when pointing straight down. For example, in one embodiment, the rotation order may be pitch, roll and yaw from the innermost to outermost rotational axis. In another embodiment, the rotation order may be pitch, roll and yaw from the outermost to the innermost rotational axis. Any rotation order (e.g., pitch/yaw/roll, roll/pitch/yaw, roll/yaw/pitch, yaw/roll/pitch, or yaw/pitch/roll from outermost to the innermost rotational axis, or from innermost to outermost rotational axis) of the payload device may be contemplated.

Figure 15:
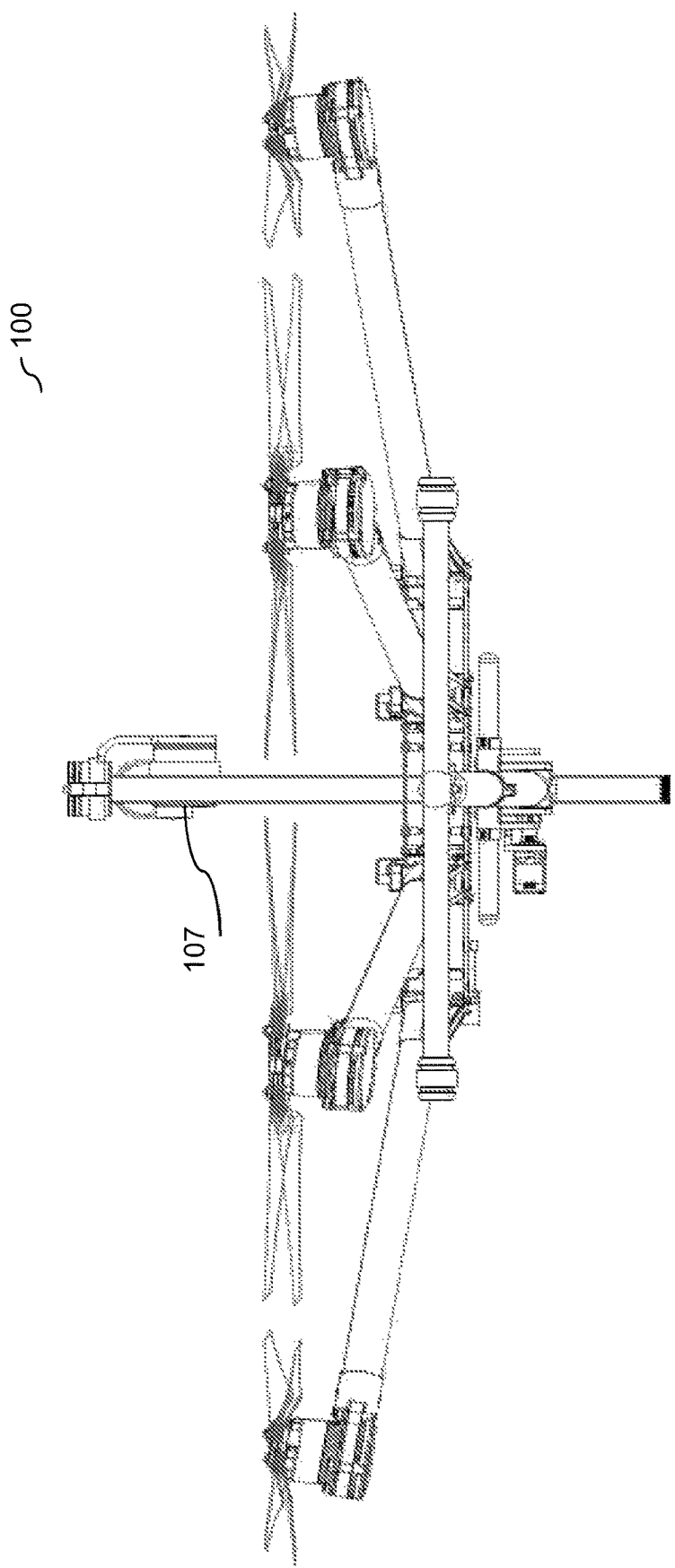
FIG. 15 is a side view of the UAV of FIG. 11 in accordance with embodiments of the invention.

FIG. 15 is a side view of the UAV of FIG. 11 in accordance with embodiments of the invention. As illustrated in FIG. 15, the carrier including the guide screw rod permits the payload to pass through the central body of the UAV, and below and above the UAV or the propulsion units of the UAV. The payload may pass through the UAV central body in a manner such that at a given point in time, the payload is laterally surrounded by the central body. The payload may be surrounded around 360 degrees, or 180 degrees or more. Once the payload reaches an upper position from a lower position, the payload may perform corresponding tasks. As previously noted, when the payload is an imaging device, it may be capable of performing low angle shooting by rotating upwards about a pitch axis. Thereby, the different shooting angle from the conventional shooting, which generally performs high angle shooting, could be achieved. For example, if the shooting target is a parachuting enthusiast floating in the air, then the imaging device may take a photo or video for the enthusiast under the parachute if the UAV is flying below the enthusiast. In some embodiments, based on the real-time feedback data or nearly real-time feedback data, the user, even including the parachuting enthusiast at issue, may use the remote controller to control the payload's position, for example, moving a little downwards, or moving in a vertical direction while rotating in different axes, thereby recording image or video data with different angles of view. In some embodiments, a combination or fusion of the images respectively obtained by the high angle shooting and the low angle shooting would engender a panoramic picture or image, thereby obtaining a high-quality image with more comprehensive details.

When the payload reaches the top position of the carrier, it may perform corresponding operations. For example, when the payload is an imaging device, it may perform shooting or photography operations. As mentioned before, based on the driving force provided by the gimbal via one or more actuators (e.g., motors), the imaging device may rotate about one or more axes of rotation. For example, based on the actuation of the a plurality of actuators, the imaging device may be capable of rotating about one or more of a pitch axis, a yaw axis, and a roll axis. When the imaging device is rotating about the yaw axis, the images of the carrier may run into the view angle of the imaging device, for example, the guides of the carrier obstructing the view angle of the imaging device, which is not desirable for shooting. To this end, in some embodiments, the imaging device may rotate about the pitch axis, for example, based on the rotating actuation of the actuator 382, such that the guides of the carrier may not block the view angle of the imaging device. For example, the imaging device may be flipped relative to the guides of the carrier such that it may be positioned at the top. Therefore, it is possible to exclude the visual obstructions imposed by the guides of the carrier. For example, when panoramic shooting is desired, the imaging device at this top position may be capable of performing 360 degree photography or performing photography more laterally without any obstruction. This flipping operation may be performed in response to the detection of the image of the carrier in the view angle of the imaging device. Alternatively, the flipping operation may be performed automatically once the payload reaches the top position of the carrier, e.g., the top ends of guides.

Figure 16:
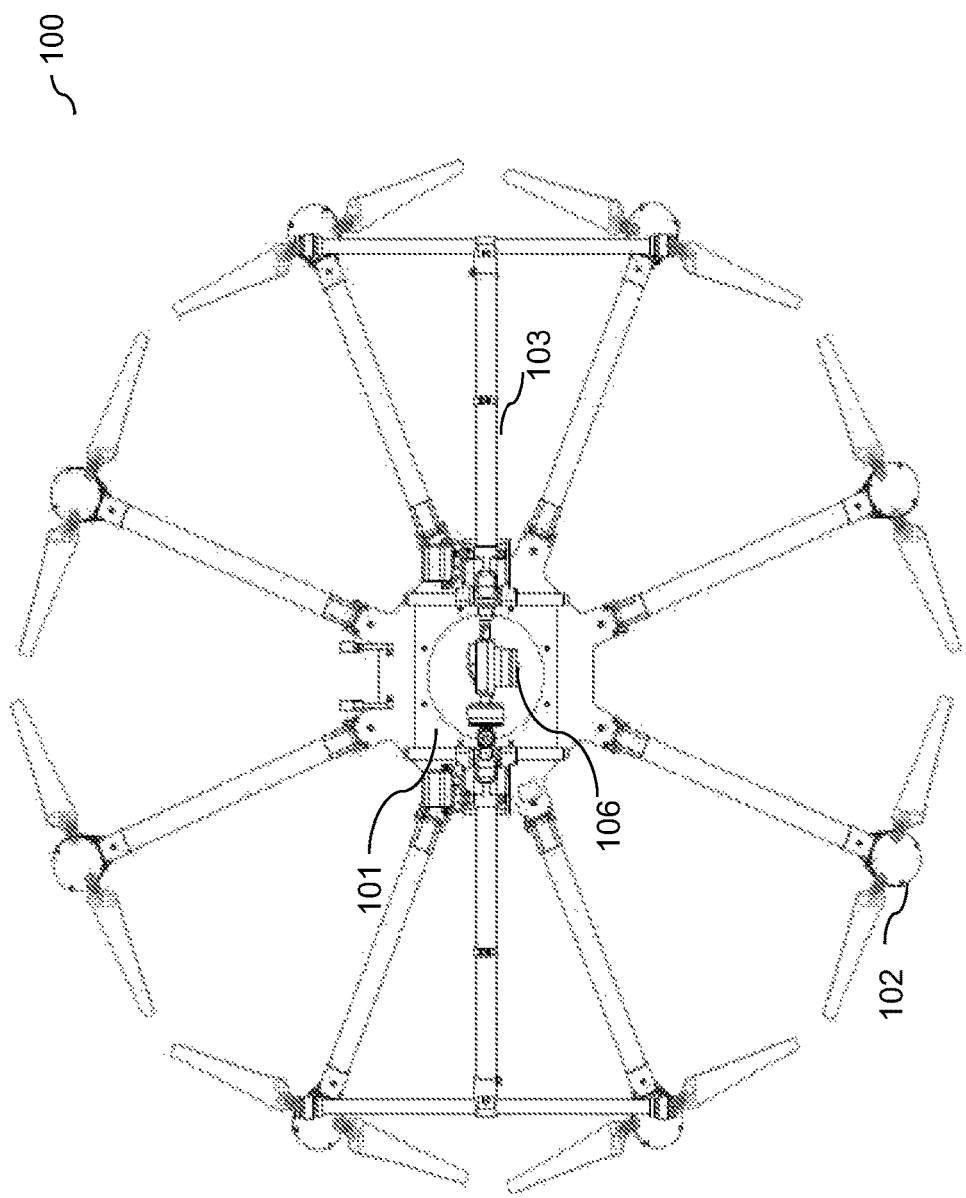
FIG. 16 is a vertical view of the UAV of FIG. 11 in accordance with embodiments of the invention.

FIG. 16 is a vertical view of the UAV of FIG. 11 in accordance with embodiments of the invention. As illustrated in FIG. 16, the exemplary UAV comprises eight propulsion units which respectively disposed on the central body using respective extending arms or frame assemblies. Any number of propulsion units may be provided. The propulsion units may optionally be radially disposed. In some instances, the propulsion units may be equidistant from the central body. The propulsion units may supported by frame assemblies that are at the same angles relative to one another laterally. Further, two support members are also coupled to the central body for supporting the UAV when it is resting on the ground. In some embodiments, when the UAV is flying in the air, the two support members may be pulled back, therefore providing more operation spaces for the UAV. The support members may be landing stands configured to bear weight of the UAV when the UAV is on the ground. The support members may have a sufficient length that may prevent the carrier and/or payload from touching the ground when the support members are in a lowered position to support the UAV. The carrier according to the embodiments of the invention may be arranged at the central area of the central body. As illustrated, one, two, or more guides of the carrier are vertically fixed to the periphery of the central cavity of the central body and are parallel to each other. The payload, e.g., an imaging device, may be carried by the gimbal coupled to the guides of the carrier. Therefore, the payload may move along the length of the guides while rotating or without rotating.

Further, as discussed before, a terminal, e.g., a remote controller, may be provided accordingly to control the positioning of the payload on the UAV. In some embodiments, the remote controller may comprise one or more processors configured to generate a user control instruction for controlling the UAV as illustrated in FIGS. 10-16. The user control instruction may include enabling the movement of the payload, disenabling the movement of the payload, causing the movement of the payload in a given direction, for a given period of time, stopping the movement of the payload, resuming the movement of the payload, stopping shooting during the movement, stopping, starting, or resuming shooting within a predetermined distance. The remote controller may further comprise a communication unit, such as a wireless transceiver, for transmitting the user control instruction as discussed above to the UAV. Correspondingly, the UAV may include a communication unit, such as a wireless transceiver, to receive such a user control instruction and may include one or more processors to process this user control instruction, thereby causing the payload to perform the corresponding actions, such as moving above or below the central body, moving above or below the propulsion units, moving vertically, moving horizontally, rotating about one or more exes of rotation. In some embodiments, the user may configure the imaging device to perform or not to perform shooting while moving. For example, the user may configure, via a touch sensitive screen on the remote controller, the imaging device to perform the shooting while the carrier is permitting the imaging device to move. Further, the user may also configure the imaging device to stop shooting when it is moving. In this way, the image or video including the central body or the propulsion units (e.g., the blades) may be precluded. Further, whether to perform the shooting within a specific moving distance may also be predetermined or configured. For example, if a minimum moving range in which the shooting is unexpected is determined, then the payload is not allowed to perform shooting once it is moving into this range. The range herein may be a distance from a certain location on the guides below the central body to a certain location on the guides above the central body. In some embodiments, the range herein may be a distance from a certain location on the guides below the propulsion units to a certain location on the guides above the propulsion units. The range herein may additionally be a distance from a certain location on the guides to the bottom end of the guides or a distance from a certain location on the guides to the top end of the guides. When the payload is moving within this range, it is allowed to perform shooting since the central body or the propulsion units of the UAV may not block its angle of view to a certain degree.

Figure 17:
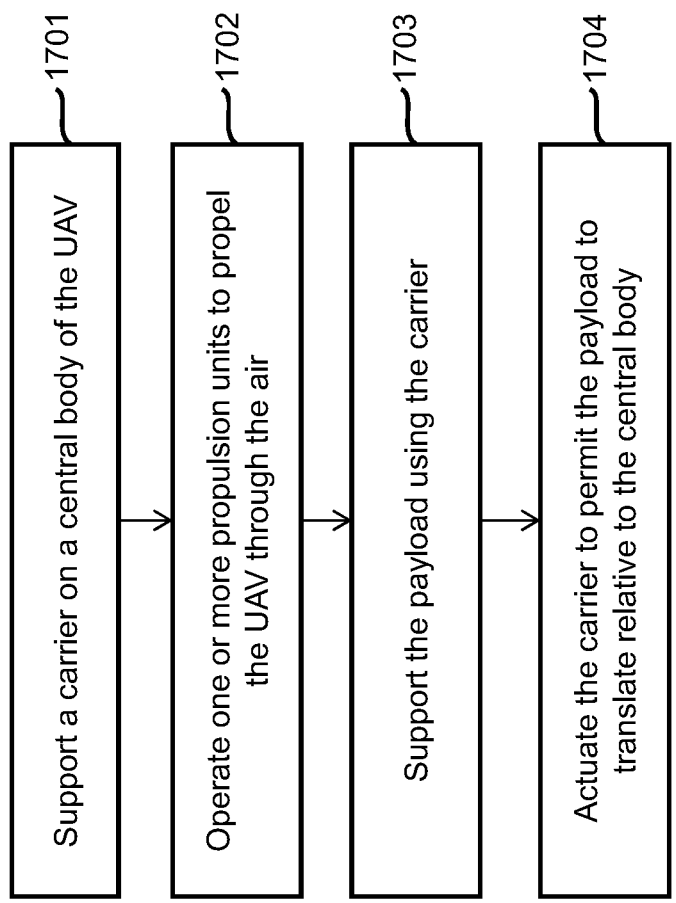
FIG. 17 is a flow chart illustrating a method for controlling positioning of a payload according to embodiments of the invention.

FIG. 17 is a flow chart illustrating a method for controlling positioning of a payload according to embodiments of the invention. As illustrated in FIG. 17, the method 1700 may comprise supporting a carrier on a central body of a UAV at 1701. The UAV herein may be those such as shown in FIGS. 1-16. The method 1700 may also comprise operating one or more propulsion units to propel the UAV through the air at 1702. The one or more propulsion units may be respectively disposed on the central body through one or more frame assemblies or arms extending from the central body. The method 1700 may further comprise supporting the payload using the carrier at 1703. The method 1700 may additionally comprise actuating the carrier to permit the carrier to translate relative to the central body at 1704.

In some embodiments, the carrier may be configured to permit the payload to move above and below the central body. Additionally or alternatively, the carrier is configured to permit the payload to move above and below the one or more propulsion units. The direction that the carrier may permit the payload to translate may be a horizontal direction or a vertical direction relative to the central body. When moving vertically, the payload may translate above and/or below the central body or any other component of the UAV. When moving horizontally, the payload may translate to the right and/or left of the central body or any other component of the UAV, to the front and/or rear of the central body or any other component of the UAV, or to any first side and/or opposing second side of the central body or any other component of the UAV. When moving horizontally, the payload may remain above the central body or any other component of the UAV, or below the central body or any other component of the UAV. The payload may also be capable of rotating about one or more axes of rotation with the aid of a gimbal assembly. Therefore, the carrier may permit the payload to translate in the vertical direction while permitting rotation of the payload. The carrier may permit the payload to translate in the vertical direction without requiring any rotation of the payload. That is, whether the payload is permitted to rotate could be flexibly configured. In some embodiments, the carrier may permit the payload to translate in the vertical direction while permitting translation in a horizontal direction or without requiring any translation in a horizontal direction. The carrier herein may comprise one or more actuator and the carrier permits the payload to translate in the vertical direction in response to actuation of at least one actuator of the carrier.

The carrier according to embodiments of the invention may be implemented in many forms as long as the carrier has the capability of causing the payload to move in a desired direction. In some embodiments, the carrier may comprise at least one vertical rod and this vertical rod may pass through the central body of the UAV. Alternatively, the carrier may comprise at least two vertical rods that are substantially parallel to one another and pass through the central body of the UAV.

To drive the payload to move above or below the central body or propulsion units of the UAV, the carrier may comprise at least one actuation assembly disposed on the at least one vertical rod, which may pass through the central body of the UAV.

The at least one actuation assembly as described herein may comprise at least one motor and its position may be flexibly selected. For example, the at least one motor may be positioned above or below the central body. In some embodiments, the at least one actuation assembly may comprise a guide screw, as exemplarily illustrated in the UAV of FIGS. 10-16, and the guide screw is arranged on the at least one vertical rod and engages with the payload such that the at least one motor drives the guide screw to translate the payload relative to the central body. In some embodiments, the at least one actuation assembly may comprise a synchronous belt, as exemplarily illustrated in the UAV of FIGS. 3-9, and the synchronous belt is arranged on the at least one vertical rod and connects with the payload such that the at least one motor drives the synchronous belt to translate the payload relative to the central body. Alternatively, the at least one actuation assembly may comprise a steel wire rope, and the steel wire rope is arranged on the at least one vertical rod and connects with the payload such that the at least one motor drives the steel wire rope to translate the payload relative to the central body.

The payload herein may be any suitable load that could be coupled to the UAV and perform corresponding tasks. In some embodiments, the payload may be an imaging device and the carrier comprises a gimbal coupled to the image device, and the method may further comprise configuring the gimbal to rotate the imaging device in one or more axes of rotation. In other words, the gimbal may actuate the imaging device to rotate in various directions while the imaging device is moving.

Dependent on different configurations, the method may comprise operating the imaging device to keep shooting while translating. Further, the method may comprise operating the imaging device to stop shooting while translating.

In some embodiments, to more precisely or accurately control the operations of the imaging device, the method may further comprise operating the imaging device to keep shooting within a certain translation distance or operating the imaging device to stop shooting within a certain translation distance.

Since the imaging device may move freely above or below the central body of the UAV, the method may further comprise operating the imaging device to perform high angle shooting at a bottom end of the carrier relative to the central body and operating the imaging device to perform low angle shooting at a top end of the carrier relative to the central body. Therefore, the imaging device may be capable of performing multi-angle shooting and the images respectively captured above the central body and below the central body could be combined or fused to form a panorama image with more graphic details.

The method may further comprise predetermining a translation distance of the payload relative to the central body. Therefore, the payload may move along the guides by the corresponding distance according to the pre-configuration. In some embodiments, the method may further comprise applying one or more sensors or assemblies to measure the translation distance of the payload relative to the central body. These one or more sensor or assemblies may comprise one or more Hall sensors or one or more digital vernier callipers. Thereby, the user may be informed of the current location of the payload relative to the central body. For example, the method may comprise visually displaying the measured translation distance to the user.

To this end, the user may use a remote controller to receive feedback data, such as the current location, the translation direction, the moving distance, etc., and upon receiving the feedback data, the user may determine whether or not to make corresponding adjustments. For example, the user may instruct the payload to move further in a vertical direction such that the low angle shooting could be conducted. Again, the user may also instruct the payload not to move any more since the power supply is in a low state. The communication between the payload and the user could be done in many suitable manners. For example, there may be respective communication units in the UAV and the remote controller and these communication units, which may be embodied as transceivers, may be used to establish wireless communication between the UAV and the remote controller and perform interactive communication.

Figure 18:
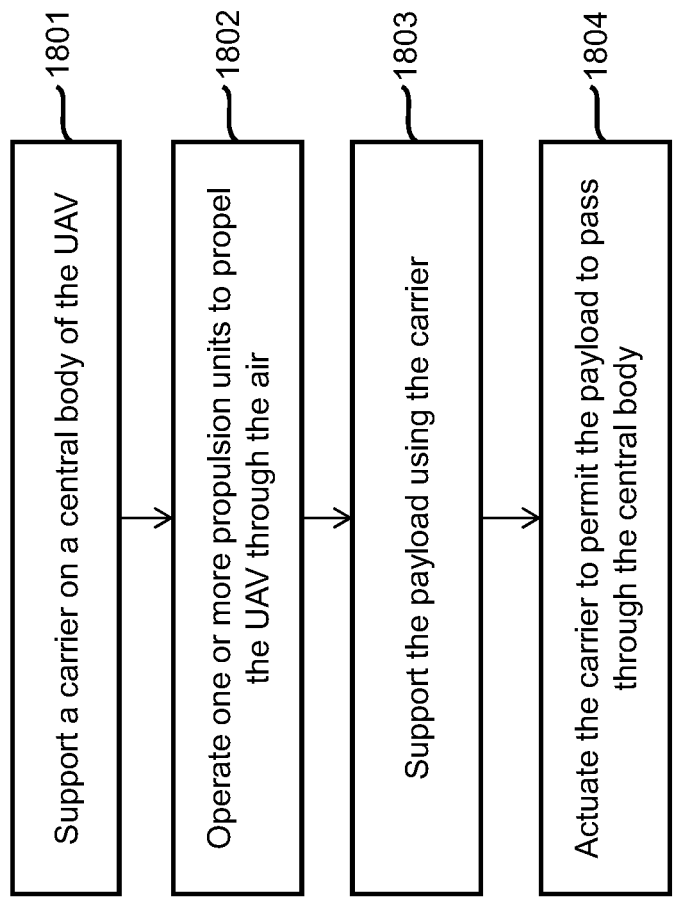
FIG. 18 is a flow chart illustrating another method for controlling positioning of a payload according to embodiments of the invention.

FIG. 18 is a flow chart illustrating another method 1800 for controlling positioning of a payload according to embodiments of the invention.

As illustrated in FIG. 18, the method 1800 may comprise supporting a carrier on a central body of a UAV at 1801. The method 1800 may also comprise operating one or more propulsion units to propel the UAV through the air at 1802. The method 1800 may further comprise supporting the payload using the carrier at 1803 and may additionally comprise actuating the carrier to permit the payload to pass through the central body at 1804. The UVA herein may refer to those such as exemplarily illustrated in the accompanying drawings.

According to different arrangements and configurations, the carrier may be configured to cause the payload to perform different movements. For example, in some embodiments, the carrier may be configured to permit the payload to pass through the central body in a vertical direction. Further, the carrier may be configured to permit the payload to pass through the central body in the vertical direction without requiring any rotation of the payload. Alternatively, the carrier may be configured to permit the payload to pass through the central body in the vertical direction while permitting rotation of the payload. Additionally, the carrier may be configured to permit the payload to pass through the central body in the vertical direction without requiring any translation in a horizontal direction or while permitting movement in a horizontal direction. When moving vertically, the payload may translate above and/or below the central body or any other component of the UAV. When moving horizontally, the payload may translate to the right and/or left of the central body or any other component of the UAV, to the front and/or rear of the central body or any other component of the UAV, or to any first side and/or opposing second side of the central body or any other component of the UAV. When moving horizontally, the payload may remain above the central body or any other component of the UAV, or below the central body or any other component of the UAV. It is to be understood that the payload according to the embodiments of the invention may move in a flexible manner.

The carrier may permit the payload to pass through the central body in the vertical direction in response to actuation of at least one actuator of the carrier. In some embodiments, the carrier may comprise at least one vertical rod, which may pass through the central body of the UAV, such as those exemplarily illustrated in FIGS. 1 and 2. Alternatively and additionally, the carrier may comprise at least two vertical rods that are substantially parallel to one another pass through the central body of the UAV.

To actuate the payload to move across the central body of the UAV, the carrier may comprise at least one actuation assembly disposed on the at least one vertical rod and the at least one actuation assembly may comprise at least one motor. The location of the at least one motor may be suitably selected. For example, the at least one motor is positioned above or below the central body.

To facilitate the smooth movement of the payload relative to the central body, in some embodiments, the at least one actuation assembly may comprise a guide screw, and the guide screw may be arranged on the at least one vertical rod and engage with the payload such that the at least one motor may drive the guide screw to move the payload relative to the central body. In some embodiments, the at least one actuation assembly may comprise a synchronous belt, and the synchronous belt may be arranged on the at least one vertical rod and connect with the payload such that the at least one motor may drive the synchronous belt to move the payload relative to the central body. Alternatively or additionally, the at least one actuation assembly may comprise a steel wire rope, and the steel wire rope may be arranged on the at least one vertical rod and connect with the payload such that the at least one motor drives the steel wire rope to move the payload relative to the central body.

The payload herein may be any desired load that is to be coupled to the UAV and perform a variety of tasks. In some embodiments, the payload may be an imaging device and the carrier may comprise a gimbal coupled to the imaging device, and the method may further comprise configuring the gimbal to rotate the imaging device in one or more axes of rotation. In this manner, in addition to the movement in the vertical or horizontal direction, the payload may be capable of rotating about any of a roll axis, a pitch axis and a yaw axis.

In some embodiments, the method may comprise operating the imaging device to keep shooting while moving. The method may also comprise operating the imaging device to stop shooting while moving. For example, in order to save the power, the shooting may be temporally shut down while moving and may be resumed after the desired location is reached, for example, at the top end of the guides above the central body. In some embodiments, the method may further comprise operating the imaging device to keep shooting within a certain moving distance. The method may additionally comprise operating the imaging device to stop shooting within a certain moving distance. The moving distance may be configured according to user's preferences or experiential data. For example, the moving distance may be from bottom ends of the guides to a location through which the image of the central body or the propulsion units may appear in the viewfinder of the imaging device. The moving distance of the imaging device relative to the central body of the UAV may be measured by one or more sensors or assemblies. The one or more sensors may comprise one or more Hall sensors. Alternatively or additionally, one or more digital vernier callipers may be applied to measure the moving distance of the imaging device. In some embodiments, the measured moving distance may be returned to the user. To this end, the UAV may comprise one or more processors and a communication unit, which may be embodied as a wireless transceiver. The communication unit may transmit the measured moving distance to the remote controller held by the user. Upon receipt of the measured moving distance, the user may learn the movement of the imaging device in real time and may make corresponding adjustments.

The method may further comprise operating the imaging device to perform high angle shooting at a bottom end of the carrier relative to the central body and operating the imaging device to perform low angle shooting at a top end of the carrier relative to the central body. In this way, different images recorded with different any of views could be combined or fused to obtain a panoramic image.

Figure 19:
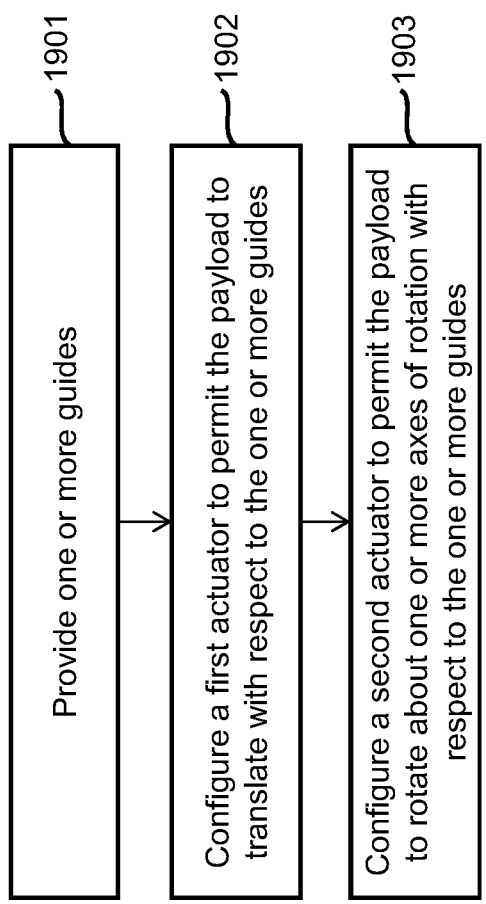
FIG. 19 is a flow chart illustrating a further method for controlling positioning of a payload according to embodiments of the invention.

FIG. 19 is a flow chart illustrating a further method 1900 for controlling positioning of a payload according to embodiments of the invention.

As illustrated in FIG. 19, the method 1900 may comprise providing one or more guides at 1901. The method 1900 may also comprise configuring a first actuator to permit the payload to translate with respect to the one or more guides at 1902. The method 1900 may further comprise configuring a second actuator to permit the payload to rotate about one or more axes of rotation with respect to the one or more guides at 1903.

In some embodiments, the one or more guides may be one or more bars, which may be oriented vertically or horizontally. The first actuator may be configured to permit the payload to translate with respect to the one or more guides in a horizontal or vertical direction. According to different configurations and arrangements, the first actuator may permit the payload to translate in the vertical direction without any rotation of the payload by the second actuator or the first actuator may permit the payload to translate in the vertical direction while the second actuator permits rotation of the payload. Alternatively or additionally, the first actuator may permit the payload to translate in the vertical direction without requiring any translation in a horizontal direction. Further, the first actuator may permit the payload to translate in the vertical direction while permitting translation in a horizontal direction.

The method may comprise providing at least one vertical guide, which may pass through a central body of the UAV. Further, the method may comprise providing at least two vertical guides that are substantially parallel to one another and may pass through a central body of the UAV. To permit the payload to move, the method may comprise disposing the first actuator on the at least one vertical guide. The first actuator may comprise at least one motor positioned above or below the central body of the UAV. In some embodiments, the first actuator may comprise a guide screw and the guide screw is arranged on the at least one vertical guide and engages with the payload such that the at least one motor drives the guide screw to translate the payload. In some embodiments, the first actuator may comprise a synchronous belt and the synchronous belt may be arranged on the at least one vertical guide and connect with the payload such that the at least one motor may drive the synchronous belt to translate the payload. Additionally or alternatively, the first actuator may comprise a steel wire rope and the steel wire rope may be arranged on the at least one vertical guide and connect with the payload such that the at least one motor may drive the wire line to translate the payload.

The method may comprise configuring the second actuator to include a gimbal coupled to the payload and configuring the gimbal to permit the payload to rotate about one or more axes of rotation with respect to the one or more guides. For example, the gimbal may be a 3-axis gimbal and the payload may be an imaging device. During the translation, the imaging device may be configured accordingly. In some embodiments, the imaging device may be configured to keep shooting while translating. In some other embodiments, the imaging device may be configured to stop shooting while translating. To further precisely control the shooting operation of the imaging device, in some embodiments, the imaging device may be configured to keep shooting within a certain translation distance or configured to stop shooting within a certain translation distance.

Based on its movement, the imaging device may perform high angle shooting at a bottom end of the carrier relative to the central body and perform low angle shooting at a top end of the carrier relative to the central body. In this manner, different images and video data could be captured with different point of views from the imaging device.

The method may comprise predetermining a translation distance of the payload with respect to one or more guides. For example, according to the user's preferences or experimental data, the user may configure the payload to move to one or more desired locations along the guides. The one or more desired locations may be those that are good for shooting or easy for the payload to be stabilized.

To better control the moving distance of the payload with respect to the one or more guides, in some embodiments, the method may comprise measuring a translation distance of the payload with respect to the one or more guides with the aid of one or more sensor or measuring assemblies, for example, one or more Hall sensors, or one or more digital vernier callipers. The measured translation distance may be transmitted back to the user, e.g., a remote controller held by the user. This could be done via respective transceivers on the UAV and the remote controller. Upon receipt of the measured distance, the user may be aware of the current location of the payload and make a corresponding adjustment, for example, instructing the payload to continue to move or instructing the payload to stop moving. In some embodiments, the user may only monitor the moving situation of the payload without further involvement until the payload reaches the desired location. To better control the movement, the method may configure a control system on-board the UAV to control the translation distance of the payload, for example, in response to a translation instruction from the remote controller. The translation instruction may be generated automatically based on the processing performed by one or more processors embed in the remote controller. For example, the one or more processors may monitor the real-time movement of the payload and may transmit the translation instruction to the UAV if necessary. The translation instruction may also be generated based on the user input. For example, the user may input his or her instruction through a display device on the remote controller and then the instruction may be transmitted to the UAV via the communication unit of the remote controller. The input approaches herein may be merely for illustrative purposes and existing or future developed input approaches may also be applicable to the embodiments of the invention.

Figure 20:
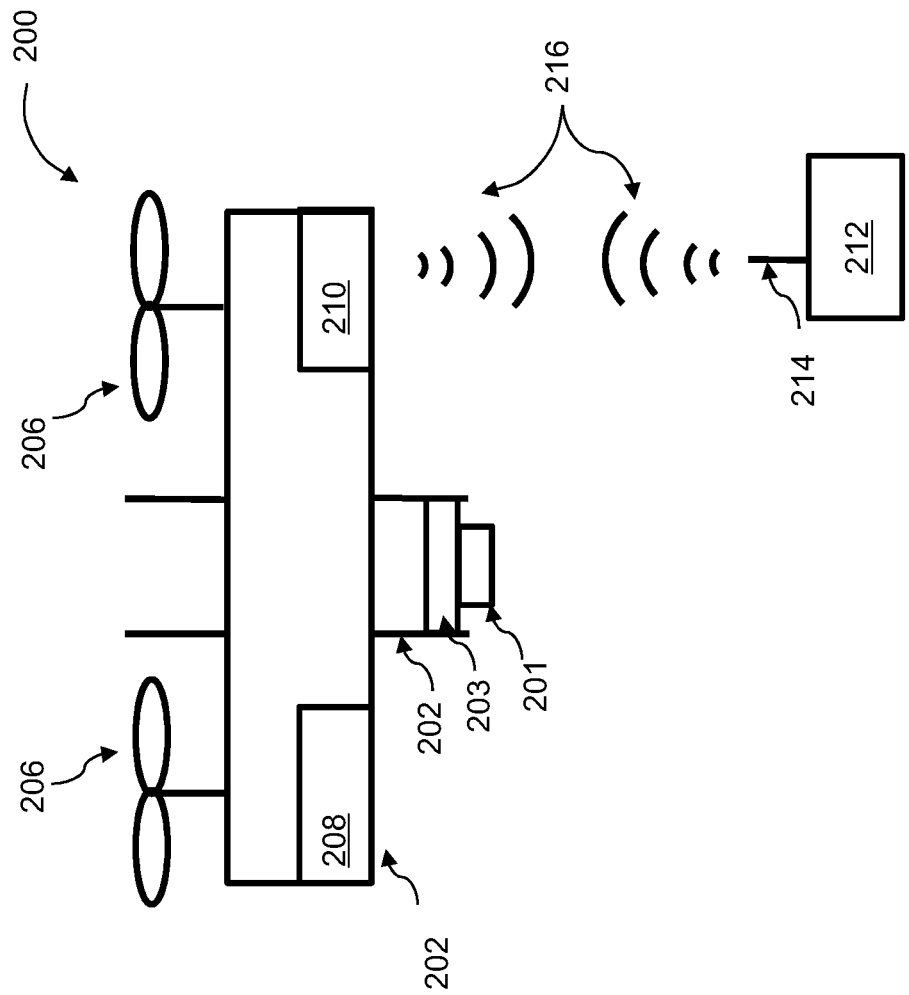
FIG. 20 illustrates a movable object in accordance with embodiments of the invention.

FIG. 20 illustrates a movable object 200 in accordance with embodiments of the invention. Although the movable object 200 is depicted as an aircraft, this depiction is only intended for illustrative purposes, and any suitable type of movable object may be used, as previously described herein. As previously described, any description herein of a UAV may apply to any type of movable object, and vice versa.

As depicted, the movable object may be configured to carry a load 201, which is coupled to the movable object via a carrier 202 as described before according to the embodiments of the invention. The load may include one or more of passengers, cargo, equipment, instruments, and the like. The load may be provided within a housing. The housing may be separate from a housing of the movable object, or be part of a housing for a movable object. Alternatively, the load may be provided with a housing while the movable object does not have a housing. Alternatively, portions of the load or the entire load can be provided without a housing. The load can be rigidly fixed relative to the movable object. Optionally, the load may be movable relative to the movable object (e.g., translatable or rotatable relative to the movable object).

In some embodiments, the load includes a payload. The payload may be configured not to perform any operation or function. Alternatively, the payload may be a payload configured to perform an operation or function, also known as a functional payload. For example, the payload may include one or more sensors for surveying one or more targets. Any suitable sensor may be incorporated into the payload, such as an imaging device (e.g., a camera), an audio capture device (e.g., a parabolic microphone), an infrared imaging device, or an ultraviolet imaging device. The sensor may provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

In some instances, the load may include a secondary carrier 203. The secondary carrier may be provided for the payload and the payload may be coupled to the carrier via the secondary carrier. Conversely, the payload may be mounted on the movable object without requiring a secondary carrier. In some embodiments, the payload may be integrally formed with the secondary carrier. Alternatively, the payload may be releasably or detachably coupled to the secondary carrier. In some embodiments, the payload may include one or more payload elements, and one or more of the payload elements may be movable relative to the movable object and/or the carrier.

The carrier may be integrally formed with the movable object. Alternatively, the carrier may be releasably coupled to the movable object. The carrier may be coupled to the movable object directly or indirectly. The carrier may provide support to the secondary carrier and payload (e.g., carry at least a part of the weight of the payload and the secondary carrier). The carrier may include a suitable mounting structure (e.g., a synchronous belt, a guide screw or a steel wire rope) for connecting to the secondary carrier. The secondary carrier may also include a suitable mounting structure (e.g., a gimbal platform) capable of stabilizing and/or directing the movement of the payload. In this case, the secondary carrier may be embodied as a gimbal or gimbal assembly. In some embodiments, the secondary carrier may be adapted to control various states of the payload (e.g., position and/or orientation) relative to the movable object. For example, the carrier (e.g., the gimbal) may be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target, a central body of the movable object, one or more propulsion units of the movable object).

In some embodiments, the carrier may be configured to permit the payload to translate relative to a central body of the moveable object. The carrier may also be configured to permit the payload to move above or below the central body of the moveable object or the propulsion units of the movable object. As described before with respect to FIGS. 1-19, the carrier may comprise at least one guide, which may be embodied as a rod or a bar. The one or more actuation assemblies, e.g., motors, may be disposed on the guide and actuate the payload to move along the guides such that the payload may pass though the central body of the movable object or translate relative to the central body or propulsion units of the movable object.

To further improve the movability and maneuverability of the payload, the secondary carrier may be configured to permit movement of the payload relative to the secondary carrier and/or movable object. The movement herein may be a translation with respect to up to three degrees of freedom (e.g., along one, two, or three axes) or a rotation with respect to up to three degrees of freedom (e.g., about one, two, or three axes), or any suitable combination thereof.

In some instances, the secondary carrier may include a frame assembly and an actuation assembly. The frame assembly may provide structural support for the payload. The frame assembly may include individual frame components, some of which may be movable relative to one another. The actuation assembly may include one or more actuators (e.g., motors) that actuate movement of the individual frame components. The actuators may permit the movement of multiple frame components simultaneously, or may be configured to permit the movement of a single frame component at a time. The movement of the frame components may produce a corresponding movement of the payload. For example, the actuation assembly may actuate a rotation of one or more frame components about one or more axes of rotation (e.g., roll axis, pitch axis, or yaw axis). The rotation of the one or more frame components may cause a payload to rotate about one or more axes of rotation relative to the movable object. Alternatively or in combination, the actuation assembly may actuate a translation of one or more frame components along one or more axes of translation, and thereby produce a translation of the payload along one or more corresponding axes relative to the movable object.

In some instances, the payload may be provided on the movable object without requiring the secondary carrier. The movable object may include propulsion mechanisms, a sensing system, and a communication system. The propulsion mechanisms may include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms may enable the movable object to take off vertically from a surface or land vertically on a surface without requiring any horizontal movement of the movable object (e.g., without traveling down a runway). Optionally, the propulsion mechanisms may be operable to permit the movable object to hover in the air at a specified position and/or orientation.

For example, the movable object can have multiple horizontally oriented rotors that can provide lift and/or thrust to the movable object. The multiple horizontally oriented rotors can be actuated to provide vertical takeoff, vertical landing, and hovering capabilities to the movable object. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object (e.g., with respect to up to three degrees of translation and up to three degrees of rotation).

One of skill in the art would appreciate that any of the embodiments described herein in the context of aircraft systems may be applied to any suitable movable object (e.g., a UAV). The UAV may include a propulsion system having one or more rotors. Any number of rotors may be provided (e.g., one, two, three, four, five, six, or more). The rotors or other propulsion systems of the UAV may enable the UAV to hover/maintain position, change orientation, and/or change location. The distance between shafts of opposite rotors may be any suitable length. For example, the length may be less than or equal to 2 m, or less than equal to 5 m. In some embodiments, the length may be within a range from 40 cm to 7 m, from 70 cm to 2 m, or from 5 cm to 5 m. Any description herein of a UAV may apply to a movable object, such as a movable object of a different type, and vice versa.

The sensing system may include one or more sensors that may sense the spatial disposition, velocity, and/or acceleration of the movable object (e.g., with respect to up to three degrees of translation and up to three degrees of rotation). Further, the one or more sensors may be used to sense and measure moving distances of the payload relative to the central body or propulsion units of the UAV, e.g., one or more Hall sensors or digital vernier callipers. Additionally, the one or more sensors may include global positioning system (GPS) sensors, motion sensors, inertial sensors, proximity sensors, or image sensors. The sensing data provided by the sensing system may be used to control the spatial disposition, velocity, and/or orientation of the movable object (e.g., using a suitable processing unit and/or control module, as described below) and moving directions and moving distances of the payload. Alternatively, the sensing system may be used to provide data regarding the environment surrounding the movable object, such as weather conditions, proximity to potential obstacles, location of geographical features, location of manmade structures, and the like.

The communication system may enable communication with a terminal 212 having a communication system 214 via wireless signals 216.

In some embodiments, the movement of the movable object, carrier, and payload relative to a fixed reference frame (e.g., the surrounding environment) and/or to each other, may be controlled by the terminal. The terminal may be a remote control device at a location distant from the movable object, the carrier, the secondary carrier, and/or payload. The terminal may be disposed on or affixed to a support platform. Alternatively, the terminal may be a handheld or wearable device. For example, the terminal may include a smartphone, tablet, laptop, computer, glasses, gloves, helmet, microphone, or suitable combinations thereof. The terminal may include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal may be used to control any suitable states of the movable object, the carrier, the secondary carrier, and/or payload. For example, the terminal may be used to control the position and/or orientation of the movable object, the carrier, the secondary carrier, and/or payload relative to a fixed reference from and/or to each other. In some embodiments, the terminal may be used to control individual elements of the movable object, the carrier, the secondary carrier, and/or payload, such as the actuation assembly of the carrier, the actuation assembly of the secondary carrier, a sensor of the payload, or an emitter of the payload. The terminal may include a wireless communication device adapted to communicate with one or more of the movable object, the carrier, the secondary carrier or the payload. For example, the terminal may control the translation or the movement of the payload relative to the central body or the propulsion units of the movable object.

The terminal may include a suitable display unit for viewing information of the movable object, carrier, secondary carrier and/or payload. For example, the terminal may be configured to display information of the movable object, carrier, secondary carrier, and/or payload with respect to position, translational velocity, translational acceleration, orientation, angular velocity, angular acceleration, or any suitable combinations thereof. In some embodiments, the terminal may display information provided by the payload, such as data provided by a functional payload (e.g., images recorded by a camera or other image capturing device). In some embodiments, the terminal may display the translation details of the payload relative to the central body or the propulsion units of the movable object, such as the translation directions, translation distances, movement states, etc.

Optionally, the same terminal may both control the movable object, carrier, secondary carrier and/or payload, or a state of the movable object, carrier, secondary carrier and/or payload, as well as receive and/or display information from the movable object, carrier, secondary carrier and/or payload. For example, a terminal may control the positioning of the payload relative to the central body or the propulsion units of the movable object, while displaying image data captured by the payload, or information about the position of the payload. Alternatively, different terminals may be used for different functions. For example, a first terminal may control movement or a state of the movable object, carrier, secondary carrier and/or payload while a second terminal may receive and/or display information from the movable object, carrier, and/or payload. For example, a first terminal may be used to control the positioning of the payload relative to an environment (e.g., the central body or the propulsion units of the movable object) while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

In some embodiments, the terminal may provide control data to one or more of the movable object, carrier, secondary carrier, and payload and receive information from one or more of the movable object, carrier, secondary carrier and payload (e.g., position and/or motion information of the movable object, carrier, secondary carrier or payload; data sensed by the payload such as image data captured by a camera). In some instances, control data from the terminal may include instructions for relative positions, movements, actuations, or controls of the movable object, carrier, secondary carrier and/or payload. For example, the control data may result in a modification of the location and/or orientation of the movable object (e.g., via control of the propulsion mechanisms), or a movement of the payload with respect to the movable object (e.g., via control of the carrier and the secondary carrier). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view, moving along the guides of the carrier).

In some instances, the communications from the movable object, carrier, secondary carrier and/or payload may include information from one or more sensors (e.g., of the sensing system or of the payload). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, secondary carrier and/or payload. Such information from a payload may include data captured by the payload or a sensed state of the payload. The control data transmitted by the terminal may be used to control states of one or more of the movable object, carrier, secondary carrier or payload. Alternatively or in combination, the carrier, secondary carrier and payload may each include a communication module configured to communicate with terminal, such that the terminal can communicate with and control each of the movable object, carrier, secondary carrier and payload independently.

In some embodiments, the movable object may be configured to communicate with another remote device in addition to the terminal, or instead of the terminal. The terminal may also be configured to communicate with another remote device as well as the movable object. For example, the movable object and/or terminal may communicate with another movable object, carrier or a secondary carrier or payload of another movable object. When desired, the remote device may be a second terminal or other computing device (e.g., computer, laptop, tablet, smartphone, or other mobile device). The remote device may be configured to transmit data to the movable object, receive data from the movable object, transmit data to the terminal, and/or receive data from the terminal. Optionally, the remote device may be connected to the Internet or other telecommunications network, such that data received from the movable object and/or terminal may be uploaded to a website or server.

The communication systems and may include any number of transmitters, receivers, and/or transceivers suitable for wireless communication. The communication may be one-way communication, such that data may be transmitted in only one direction. For example, one-way communication may involve only the movable object transmitting data to the terminal, or vice-versa. The data may be transmitted from one or more transmitters of the communication system to one or more receivers of the communication system, or vice-versa. Alternatively, the communication may be two-way communication, such that data may be transmitted in both directions between the movable object and the terminal. The two-way communication may involve transmitting data from one or more transmitters of the communication system to one or more receivers of the communication system, and vice-versa.

Figure 21:
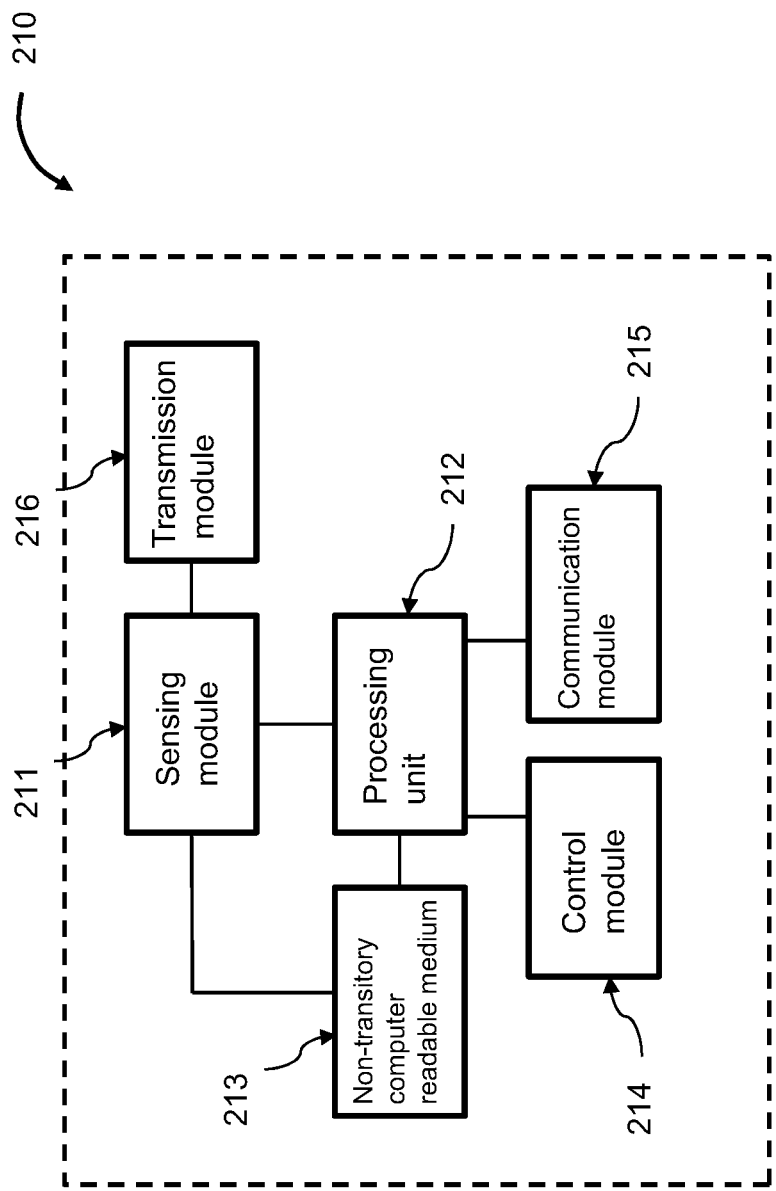
FIG. 21 is a schematic illustration by way of block diagram of a system for controlling a movable object in accordance with embodiments.

FIG. 21 is a schematic illustration by way of block diagram of a system 210 for controlling a movable object in accordance with embodiments. The system 210 may be used in combination with any suitable embodiment of the systems, devices, and methods disclosed herein. The system 210 may include a sensing module 211, a processing unit 212, a non-transitory computer readable medium 213, a control module 214, and a communication module 215.

The sensing module may utilize different types of sensors that collect information relating to the movable objects in different ways and collect information relating to the movement of a payload with respect to a part of the movable object, such as a central body or propulsion units of the movable object. Different types of sensors may sense different types of signals or signals from different sources. For example, the sensors may include inertial sensors, GPS sensors, proximity sensors (e.g., lidar), or vision/image sensors (e.g., a camera). The sensing module may be operatively coupled to a processing unit having a plurality of processors. In some embodiments, the sensing module can be operatively coupled to a transmission module 216 (e.g., a Wi-Fi image transmission module) configured to directly transmit sensing data to a suitable external device or system. For example, the transmission module may be used to transmit images captured by a camera of the sensing module to a remote terminal. Further, the transmission module may be used to transmit moving distances of the payload relative to the central body of the moveable object (e.g., a UAV) to the remote terminal for user's observations.

The processing unit can have one or more processors, such as a programmable processor (e.g., a central processing unit (CPU)). The processing unit may be operatively coupled to a non-transitory computer readable medium. The non-transitory computer readable medium may store logic, code, and/or program instructions executable by the processing unit for performing one or more steps, such as those exemplarily illustrated in FIGS. 17-19. The non-transitory computer readable medium may include one or more memory units (e.g., removable media or external storage such as an SD card or random access memory (RAM)). In some embodiments, data from the sensing module may be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit may be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium may be used to store the processed results produced by the processing unit.

In some embodiments, the processing unit may be operatively coupled to the control module configured to control various states of the movable object, a carrier, a secondary carrier, and/or a payload as discussed with reference to FIGS. 1-20. For example, the control module may be configured to control the propulsion mechanisms of the movable object to adjust the spatial disposition, velocity, and/or acceleration of the movable object with respect to six degrees of freedom. In some embodiments, the control module may be configured to control the translation distance, the translation direction, enablement or disablement of the movement of the payload and so on.

The processing unit may be operatively coupled to the communication module configured to transmit and/or receive data from one or more external devices (e.g., a terminal, display device, or other remote controller). Any suitable means of communication can be used, such as wired communication or wireless communication, as described in further detail below. The communication module may transmit and/or receive one or more of sensing data from the sensing module, processed results produced by the processing unit, predetermined control data, user commands from a terminal or remote controller, and the like. For example, the user commands may comprise user control instructions for instructing the payload to move more or less, stop movement, and resume movement. In some embodiments, if the payload is embodies as a camera, the user control instructions may be used to control the camera to keep shooting while moving, stop shooting while moving, keep shooting within a specific moving distance, and stop shooting within a specific moving distance. In some embodiments, the communication module may be configured to implement adaptive communication mode switching, as described elsewhere herein.

The components of the system may be arranged in any suitable configuration. For example, one or more of the components of the system may be located on the movable object, carrier, payload, terminal, sensing system, or an additional external device in communication with one or more of the above. Additionally, although FIG. 21 depicts a single processing unit and a single non-transitory computer readable medium, one of skill in the art would appreciate that this is not intended to be limiting, and that the system can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV) comprising:
    a central body;
    one or more propulsion units configured to propel the UAV through the air; and
    a carrier supported by the central body, wherein the carrier is configured to support and permit a payload to translate relative to the central body, such that the payload is configured to move above and below the central body;
    wherein the payload is configured to pass through the central body and includes an imaging device configured to:
    perform high angle shooting by pointing the imaging device downwards when the imaging device is at a bottom end of the carrier relative to the central body; and
    perform low angle shooting by pointing the imaging device upwards when the imaging device is at a top end of the carrier relative to the central body.

2. The UAV of claim 1, wherein the carrier is configured to permit the payload to pass through the central body.

3. The UAV of claim 2, wherein the carrier comprises at least one vertical rod that passes through the central body of the UAV, and wherein the payload is configured to move along the vertical rod to translate relative to the central body and pass through the central body.

4. The UAV of claim 3, wherein the carrier comprises at least one actuation assembly disposed on the at least one vertical rod.

5. The UAV of claim 4, wherein the at least one actuation assembly comprises a motor positioned above or below the central body or a plurality of motors positioned above and/or below the central body.

6. The UAV of claim 5, wherein the at least one actuation assembly further comprises a guide screw arranged on the at least one vertical rod and engaged with the payload, such that the one or more motors are configured to drive the guide screw to move the payload relative to the central body.

7. The UAV of claim 5, wherein the at least one actuation assembly further comprises a synchronous belt arranged on the at least one vertical rod and connected with the payload, such that the one or more motors are configured to drive the synchronous belt to move the payload relative to the central body.

8. The UAV of claim 5, wherein the at least one actuation assembly further comprises a steel wire rope arranged on the at least one vertical rod and connected with the payload, such that the one or more motors are configured to drive the steel wire rope to move the payload relative to the central body.

9. The UAV of claim 1, wherein the carrier comprises a gimbal coupled to the imaging device and configured to permit the imaging device to rotate about one or more axes as the imaging device is translated relative to the central body.

10. The UAV of claim 1, further comprising a controller configured to control a movement of the payload relative to the central body.

11. The UAV of claim 10, wherein the controller comprises one or more processors configured to generate one or more user instructions for controlling the movement of the payload.

12. The UAV of claim 10, wherein the controller is on-board the UAV and configured to control the movement of the payload in response to one or more user instructions.

13. The UAV of claim 1, wherein the carrier comprises one or more sensors configured to measure a distance that the payload moves relative to the central body.

14. A method for controlling positioning of a payload on an unmanned aerial vehicle (UAV), comprising:
supporting a carrier on a central body of the UAV and a payload on the carrier; and
actuating the carrier to permit the payload to translate relative to the central body such that the payload is configured to move above and below the central body, wherein the carrier is actuated as the UAV is propelled through the air via operation of one or more propulsion units;
wherein the payload is configured to pass through the central body and includes an imaging device configured to:
perform high angle shooting by pointing the imaging device downwards when the imaging device is at a bottom end of the carrier relative to the central body; and
perform low angle shooting by pointing the imaging device upwards when the imaging device is at a top end of the carrier relative to the central body.

15. The method of claim 14, wherein the payload is permitted to pass through the central body by actuating the carrier.

16. The method of claim 14, wherein the carrier comprises a gimbal coupled to the imaging device and configured to permit the imaging device to rotate about one or more axes as the imaging device is translated relative to the central body.

17. A remote controller for controlling positioning of a payload on an unmanned aerial vehicle (UAV), the remote controller comprising:
one or more processors configured to generate, based on a received user input, a set of control instructions for controlling the UAV of claim 1; and
a communication unit configured to transmit the set of control instructions to the UAV, wherein the set of control instructions are used to control the carrier to translate the payload relative to the central body, such that the payload is configured to move above and below the central body;
wherein the payload is configured to pass through the central body.

18. The remote controller of claim 17, wherein the set of control instructions are used to control the carrier, so as to permit the payload to pass through the central body of the UAV.

19. The remote controller of claim 17, wherein the remote controller comprises a display device configured to display one or more motion configurations selected from the group consisting of (1) motion enablement, (2) motion disablement, (3) one or more motion directions, and (4) one or more motion distances, and wherein the user input is received when a user selects the one or more configurations displayed on the display device.

20. An unmanned aerial vehicle (UAV) comprising:
a central body;
one or more propulsion units configured to propel the UAV through the air; and
a carrier supported by the central body, wherein the carrier is configured to support and permit a single payload to translate relative to the central body, such that the single payload configured to move above and below the central body;
wherein the single payload is configured to pass through the central body.

* * * * *